(12) United States Patent
Larsen et al.

(10) Patent No.: US 7,858,062 B2
(45) Date of Patent: Dec. 28, 2010

(54) SYNTHESIS AND USE OF NANOCRYSTALLINE ZEOLITES

(75) Inventors: Sarah Larsen, Iowa City, IA (US); Vicki Grassian, Iowa City, IA (US); Weiguo Song, Beijing (CN); Gonghu Li, Evanston, IL (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 12/510,776

(22) Filed: Jul. 28, 2009

(65) Prior Publication Data

US 2010/0028231 A1 Feb. 4, 2010

Related U.S. Application Data

(62) Division of application No. 11/379,015, filed on Apr. 17, 2006, now Pat. No. 7,585,490.

(60) Provisional application No. 60/671,837, filed on Apr. 15, 2005.

(51) Int. Cl.
  *B01D 53/56* (2006.01)
  *B01D 53/86* (2006.01)
  *B01D 47/00* (2006.01)
  *B01D 53/94* (2006.01)
  *B01J 8/00* (2006.01)
  *B01J 8/02* (2006.01)
  *C01B 21/00* (2006.01)
  *B01J 29/08* (2006.01)

(52) U.S. Cl. .................. 423/239.2; 423/239.1; 423/235; 423/212; 423/213.2; 502/79

(58) Field of Classification Search .................. 423/700, 423/210, 212, 213.2, 235, 239.1, 239.2; 502/79
See application file for complete search history.

(56) References Cited

U.S. PATENT DOCUMENTS 4,330,518 A 5/1982 Kostinko (Continued)

FOREIGN PATENT DOCUMENTS

CA 2106170 3/1994

(Continued)

OTHER PUBLICATIONS

"U.S. Appl. No. 11/379,015, Advisory Action mailed Jun. 26, 2008", 3 pgs.

(Continued)

*Primary Examiner*—Karl E Group
*Assistant Examiner*—Noah S Wiese
(74) *Attorney, Agent, or Firm*—Schwegman, Lundberg & Woessner, P.A.

(57) ABSTRACT

Embodiments of the present invention relate to a method for synthesizing nanocrystalline zeolites, the method comprising contacting starting products that comprise a solvent, a silicon source, a cation base, an organic template, and an aluminum source, or any combination thereof sufficient to produce a zeolite gel by hydrolysis, heating the zeolite gel sufficient to produce a first batch of zeolite crystals and a first clear solution, separating the first batch of zeolite crystals from the first clear solution, heating the first clear solution sufficient to produce a second batch of zeolite crystals and second clear solution and separating the second batch of zeolite crystals from the second clear solution. In addition, embodiments relate to a method of using nanocrystalline zeolites, the method comprising contacting a nanocrystalline zeolite with a reductant sufficient to produce a nanocrystalline zeolite with adsorbed reductant and exposing the nanocrystalline zeolite with adsorbed reductant to reactant gases sufficient to obtain reaction products and the nanocrystalline zeolite.

19 Claims, 16 Drawing Sheets

U.S. PATENT DOCUMENTS

| | | | |
|---|---|---|---|
| 4,649,036 | A | 3/1987 | Pastorello et al. |
| 4,961,917 | A | 10/1990 | Byrne |
| 5,451,387 | A | 9/1995 | Farnos et al. |
| 5,536,483 | A * | 7/1996 | Descat et al. ............ 423/239.2 |
| 5,624,658 | A | 4/1997 | Fitoussi et al. |
| 5,637,287 | A | 6/1997 | Vaughan et al. |
| 6,294,493 | B1 | 9/2001 | Strohmaier et al. |
| 6,303,099 | B1 | 10/2001 | Ichihashi et al. |
| 6,303,534 | B1 | 10/2001 | Strohmaier et al. |
| 6,624,113 | B2 * | 9/2003 | Labarge et al. ............. 502/344 |
| 6,638,487 | B2 * | 10/2003 | Wakasa et al. .............. 423/235 |
| 6,713,030 | B1 * | 3/2004 | Chandler et al. ......... 423/239.1 |
| 6,713,031 | B2 | 3/2004 | Harris et al. |
| 6,713,041 | B1 | 3/2004 | Moscoso et al. |
| 6,746,660 | B1 | 6/2004 | Chiang et al. |
| 6,777,364 | B2 | 8/2004 | Yoon et al. |
| 6,843,971 | B2 | 1/2005 | Schafer-Sindlinger et al. |
| 7,585,490 | B2 | 9/2009 | Larsen et al. |
| 2002/0127163 | A1 | 9/2002 | Chen et al. |
| 2003/0050182 | A1 | 3/2003 | Tran et al. |
| 2003/0147805 | A1 | 8/2003 | Koegler et al. |
| 2004/0014591 | A1 | 1/2004 | Muller et al. |
| 2004/0076565 | A1 | 4/2004 | Gandhi et al. |
| 2004/0105814 | A1 | 6/2004 | Rao et al. |
| 2004/0152586 | A1 * | 8/2004 | Ou et al. ...................... 502/64 |
| 2004/0171476 | A1 | 9/2004 | Nam et al. |
| 2007/0071666 | A1 | 3/2007 | Larsen et al. |

FOREIGN PATENT DOCUMENTS

| | | |
|---|---|---|
| CN | 1230466 | 10/1999 |
| DE | 19715475 | 10/1997 |
| EP | 219854 A2 | 4/1987 |
| EP | 234441 A2 | 9/1987 |
| EP | 326667 A1 | 8/1989 |
| EP | 0662450 A1 | 7/1995 |
| EP | 1065167 A1 | 1/2001 |
| EP | 1125635 A1 | 8/2001 |
| EP | 1147801 A1 | 10/2001 |
| EP | 1153648 A1 | 11/2001 |
| EP | 1314476 A1 | 5/2003 |
| JP | 63-182035 | 7/1988 |
| JP | 11-11938 | 1/1999 |
| JP | 2000-213335 | 8/2000 |
| JP | 2001-027112 | 1/2001 |
| WO | WO-00/72965 A1 | 12/2000 |
| WO | WO-2004/002611 A1 | 1/2004 |
| WO | WO-2004/050555 A1 | 6/2004 |

OTHER PUBLICATIONS

"U.S. Appl. No. 11/379,015, Non-Final Office Action mailed Sep. 24, 2008", 9 pgs.

"U.S. Appl. No. 11/379,015, Response filed Jan. 26, 2009 to Non Final Office Action mailed Dec. 5, 2008", 10 pgs.

"U.S. Appl. No. 11/379,015, Response filed Jun. 13, 2008 to Final Office Action mailed Mar. 18, 2008", 12 pgs.

"U.S. Appl. No. 11/379,015, Non-Final Office Action mailed Dec. 5, 2008", 9 pgs.

"U.S. Appl. No. 11/379,015, Non-Final Office Action mailed Oct. 3, 2007", 14 pgs.

"U.S. Appl. No. 11/379,015, Notice of Allowance mailed May 11, 2009", 7 pgs.

"U.S. Appl. No. 11/379,015, Response filed Jan. 3, 2008 to Non-Final Office Action mailed Oct. 3, 2007", 12 pgs.

"U.S. Appl. No. 11/379,015, Final Office Action mailed Mar. 18, 2008", 12 pgs.

Eapen, M. J., "Hydrothermal Crystallization of Zeolite Beta Using Tetraethylammonium Bromide", *Zeolites*, 14(4), (1994), 295-302.

Gao, H., "Preparation of TS-1 zeolite suitable for catalyzing the epoxidation of propylene", Shiyou Xuebao, Shiyou Jiagong, 16(3), (Abstract Only), (2000), 1 pg.

Li, G., "Selective Catalytic Reduction of $NO_2$ With Urea in Nanocrystalline NaY Zeolite", *Journal of Catalysis*, 234, 2005, 401-413.

Li, Q., et al., "The nucleation period for crystallization of colloidal TPA-silicalite-1 with varying silica source", *Microporous and Mesoporous Materials* 40, (2000), 53-62 pgs.

Li, Q., "The Nucleation Period for TPA-Silicalite-1 Crystallization Determined by a Two-Stage Varying-Temperature Synthesis", *Microporous and Mesoporous Materials*, 31(1-2), (1999), 141-150.

Song, W., "High yield method for nanocrystalline zeolite synthesis", *Chem. Commun*, (2005), 2951-2953.

Song, W., "Size-Dependent Properties of Nanocrystalline Silicalite Synthesized With Systematically Varied Crystal Sizes", *Langmuir*, 20, (2004), 4696-4702.

* cited by examiner

| SAMPLE | BATCH | Si/Al | SURFACE AREA $(m^2/g)^a$ | CRYSTAL SIZE$^b$ (nm) | PRODUCT YIELD$^c$ (%) |
|---|---|---|---|---|---|
| SILICALITE-1 | 1 | NA | 165 | 20 | 6.8 |
| SILICALITE-1 | 2 | NA | 158 | 20 | 13.6 |
| SILICALITE-1 | 3 | NA | 160 | 20 | 22.4 |
| SILICALITE-1 | 4 | NA | 148 | 22 | 32.5 |
| SILICALITE-1 | 5 | NA | 126 | 26 | 41.8 |
| NaY | 1 | 1.87 | 168 | 26 | 4.0 |
| NaY | 4 | 1.74 | 141 | 31 | 15.8 |
| NaY | 7 | 1.80 | 217 | 20 | 28.8 |
| NaY | 10 | 1.83 | 178 | 25 | 43.3 |

$^a$ SURFACE AREA OF AS-SYNTHESIZED SAMPLE  $^b$ CRYSTAL SIZE CALCULATED FROM EXTERNAL SURFACE AREA AS DESCRIBED PREVIOUSLY  $^c$ CUMULATIVE PRODUCT YIELD

*FIG. 5*

| PHASE | ASSIGNMENTS | | $v(^{14}N)$ | $v(^{15}N)$ | $\Delta v$ [a] | $v(^{14}N)/v(^{15}N)$ |
|---|---|---|---|---|---|---|
| GAS PHASE | HNCO | $v_{NCO}$ | 2268 | 2260 | 8 | 1.004 |
| | $N_2O$ | $v_{NN}$ | 2224 | 2201 | 23 | 1.010 |
| | $N_2O$ | $v_{NO}$ | 1285 | 1270 | 15 | 1.012 |
| | $NH_3$ | $\delta_{NH3}$ | 965 | 960 | 5 | 1.005 |
| ADSORBED IN NANOCRYSTALLINE NaY | HNCO | $v_{NCO}$ | ~2276 | ~2258 | ~18 | 1.008 |
| | $OCN^-$ | $v_{NC}$ | 2169 | 2153 | 16 | 1.007 |
| | $(NH_2)_2CO$ | $v_{CNH}$ | 1527 | 1522 | 5 | 1.003 |
| | $(NH_2)_2CO$ | $v_{CNH}$ | 1271 | 1266 | 5 | 1.004 |
| ADSORBED IN COMMERCIAL NaY | HNCO | $v_{NCO}$ | ~2282 | ~2250 | ~32 | 1.014 |
| | $OCN^-$ | $v_{NC}$ | 2175 | 2159 | 16 | 1.007 |
| | $(NH_2CO)_2NH$ | $v_{CO}$ | 1759 | 1751 | 8 | 1.005 |
| | $(HNCO)_3$ | $v_{CO}$ | 1735 | 1727 | 8 | 1.005 |

[a] $\Delta v = v(^{14}N) - v(^{15}N)$

*FIG. 6*

| CATALYST | INITIAL RATE ($\mu mol\ L^{-1}\ min^{-1}$) | | | |
|---|---|---|---|---|
| | $NH_3$ | $CO_2$ | $NO$ | $N_2O$ |
| NANOCRYSTALLINE NaY | 10.3 | 8.9 | −0.4 | 1.1 |
| COMMERCIAL NaY | 2.4 | 1.5 | −0.2 [a] | 0.1 |
| COMMERCIAL NaY [b] | 3.0 | 1.6 | − | − |

[a] THE INITIAL RATE OF NO LOSS DURING THE UREA-SCR OF $NO_2$ OVER COMMERCIAL NaY ZEOLITE WAS MEASURED FROM t = 9 min TO t = 18 min

[b] THERMAL DECOMPOSITION OF UREA IN THE PRESENCE OF $O_2$

FIG. 7

| CATALYST | CONCENTRATION ($\mu mol\ L^{-1}$) [a] | | | |
|---|---|---|---|---|
| | $NH_3$ | $CO_2$ | $NO$ | $N_2O$ |
| NANOCRYSTALLINE NaY | 56 | 138 | 0 | 12 |
| COMMERCIAL NaY | 17 | 74 | 7 | 4 |
| COMMERCIAL NaY [b] | 53 | 69 | − | − |

[a] THE CONCENTRATION OF GAS-PHASE $NH_3$ WAS MEASURED AT T=473K, THE CONCENTRATIONS OF GAS-PHASE $CO_2$, NO AND $N_2O$ WERE MEASURED AT T=298K

[b] THERMAL REACTION OF UREA IN THE ABSENCE OF $NO_2$

FIG. 8

SYNTHESIS AND USE OF NANOCRYSTALLINE ZEOLITES

RELATED APPLICATION

This application is a divisional under 37 C.F.R. 1.53(b) of U.S. patent application Ser. No. 11/379,015 filed Apr. 17, 2006, now U.S. Pat. No. 7,585,490, which claims the benefit of U.S. Provisional Patent Application Ser. No. 60/671,837 filed Apr. 15, 2005, the contents of which are incorporated herein by reference in their entirety.

STATEMENT OF GOVERNMENT RIGHTS

This invention was made, at least in part, with a grant from the Government of the United States of America (Grant No. EPA-R82960001 from the Environmental Protection Agency). The Government has certain rights in the invention.

FIELD OF TECHNOLOGY

Embodiments of the present invention relate to the fields of nanocrystalline zeolite synthesis and applications thereof. Specifically, the embodiments relate to methods of efficiently synthesizing nanocrystalline zeolites and the use of nanocrystalline zeolites as catalysts and reaction sites for selective catalytic reduction of reactant gases.

BACKGROUND OF THE INVENTION

Zeolites have well-defined, crystalline structures with pores that are in molecular size range, ion exchangeable sites and high hydrothermal stability. These properties enable zeolites to be widely used as catalysts in petrochemical processing. Nanocrystalline zeolites (with crystal sizes of 100 nm or less) can have advantages over conventional micron sized zeolites in that they have larger external surface areas, shorter diffusion path-lengths and lower tendencies to form coke. The improved properties of nanocrystalline zeolites can lead to new applications in catalysis, environmental protection and chemical sensing. Pure silica nanocrystalline zeolites are promising low-dielectric constant materials for electronics applications. Composite polymer zeolite nanocomposite membranes can be useful in air separation applications.

Current methods to synthesis nanocrystalline zeolites involve terminating the synthesis while the zeolite crystals are still in the nanometer range, thus prohibiting further crystal growth. Such methods synthesize nanocrystalline zeolites at low temperature and ambient pressure which leads to low product yields and long synthesis times. The long synthesis times are a result of the low temperature causing slow nucleation and crystal growth. Typical product yields for the nanocrystalline zeolites are less than 10% of the synthesis gel composition, as compared to near 100% yields for conventional micron-sized zeolites. Once synthesis is complete, nanocrystalline zeolites are present in colloidal suspensions and powder products are then recovered by centrifugation. The remaining synthesis solution is usually discarded after the nanocrystalline zeolites are recovered resulting in adverse environmental effects and the disposal of valuable chemical materials. Previous attempts at reusing the original synthesis solution has required the addition of template species, silicon and/or aluminum sources. In addition, many attempts at reusing the original synthesis solution have failed due to reactants polymerizing and the impurity of the nuclei for subsequent crystal growth.

Selective catalytic reduction (SCR) using ammonia or hydrocarbons is a promising technology for post-combustion treatment of $NO_x$ (NO and $NO_2$). Selective catalytic reduction utilizing ammonia ($NH_3$—SCR) has been developed and used worldwide for the control of $NO_x$ emissions in fuel combustion from stationary sources due to its efficiency, selectivity and economics. However, $NH_3$ is not a practical reducing agent for $NO_x$ emissions from mobile sources due to its toxicity and difficulties in its storage, transportation and handling. A great deal of interest has focused on using urea as a safer source of ammonia in automotive applications. Currently, a solution of urea in water is the preferred choice among different precursors for ammonia. It is generally accepted that urea thermally decomposes in two steps (reaction 1 and 2) to form ammonia and carbon dioxide.

$$(NH_2)_2CO \rightarrow NH_3 + HNCO \quad (1)$$

$$HNCO + H_2O \rightarrow NH_3 + CO_2 \quad (2)$$

Transition metal-containing zeolites have been extensively studied as SCR catalysts. Several recent studies have also used alkali and/or alkaline earth substituted Y zeolites as selective oxidation catalysts and $deNO_x$ catalysts. In the absence of transition metals, zeolite Y potentially offers novel SCR pathways different from those that occur in transition metal containing catalysts. Nanocrystalline Y zeolites and metal oxides with particle sizes less than 100 nm, can be particularly useful in environmental applications due to the small crystal sizes and large internal and external surface areas. The influence of intracrystalline diffusion on SCR reaction rates has been previously investigated for transition metal-exchanged zeolites with different crystal sizes.

SUMMARY OF THE INVENTION

Embodiments of the present invention demonstrate the synthesis of nanocrystalline zeolites in a higher yield than performed or contemplated before, by periodically removing nanocrystals from the synthesis solution and reusing the synthesis solution. Since the yield of nanocrystalline zeolite product is very low, only a small portion of nutrients in the synthesis are consumed and the clear solution composition is very close to the original synthesis solution composition. In addition, since only zeolite crystals that are heavy enough to be separated from the clear solution are removed, very small zeolite crystals are still present in the clear solution and can serve as nucleation sites, directly growing into larger crystals. Long nucleation and growth times are thus eliminated. Embodiments of the present invention synthesize nanocrystals more efficiently, more quickly, with higher yields and obtain more consistent crystal sizes than previously known.

Embodiments of the present invention include a method accomplishing the selective catalytic reduction (SCR) of $NO_2$ with urea in nanocrystalline NaY. The reaction rate for urea-SCR of $NO_2$ in nanocrystalline NaY zeolite is significantly greater than in commercial NaY zeolite with a larger crystal size. In addition, a dramatic decrease in the concentration of undesirable surface species is observed on nanocrystalline NaY compared to commercial NaY after urea-SCR of $NO_2$. The increased reactivity for urea-SCR of $NO_2$ is attributed to silanol groups and extra-framework aluminum (EFAL) species located on the external surface of nanocrystalline NaY. Specifically, $NO_x$ storage as $NO_x^-$ on the internal zeolite surface was coupled to reactive $de-NO_x$ sites on the external surface. The increased external surface area (up to ~40% of the total surface area) of nanocrystalline zeolites can be utilized as a reactive surface with unique active sites for catalysis.

BRIEF DESCRIPTION OF THE DRAWINGS

Embodiments of the invention can be best understood by referring to the following description and accompanying drawings which illustrate such embodiments. The numbering scheme for the Figures included herein are such that the leading number for a given reference number in a Figure is associated with the number of the Figure. Reference numbers are the same for those elements that are the same across different Figures. For example, a block flow diagram depicting the starting products (1) can be located in FIG. 1. However, reference numbers are the same for those elements that are the same across different Figures. In the drawings:

FIG. 5 illustrates a table depicting physical properties of synthesized nanocrystalline zeolite crystals.

FIG. 6 illustrates a table depicting vibrational frequencies of nitrogen-containing gas-phase and adsorbed species which showed an isotopic shift upon substitution of $^{15}N$ for $^{14}N$ in the adsorbed urea (($NH_2$)$_2CO$) precursor.

FIG. 7 illustrates a table depicting rates for formation of gas-phase $NH_3$, $CO_2$ and $N_2O$ and loss of gas-phase NO during urea-selective catalytic reduction (SCR) of $NO_2$ and thermal decomposition of urea.

FIG. 8 illustrates a table depicting gas-phase product distribution after urea-SCR of $NO_2$ and thermal reaction of urea.

DETAILED DESCRIPTION OF THE EMBODIMENTS OF THE PRESENT INVENTION

Figure 1:
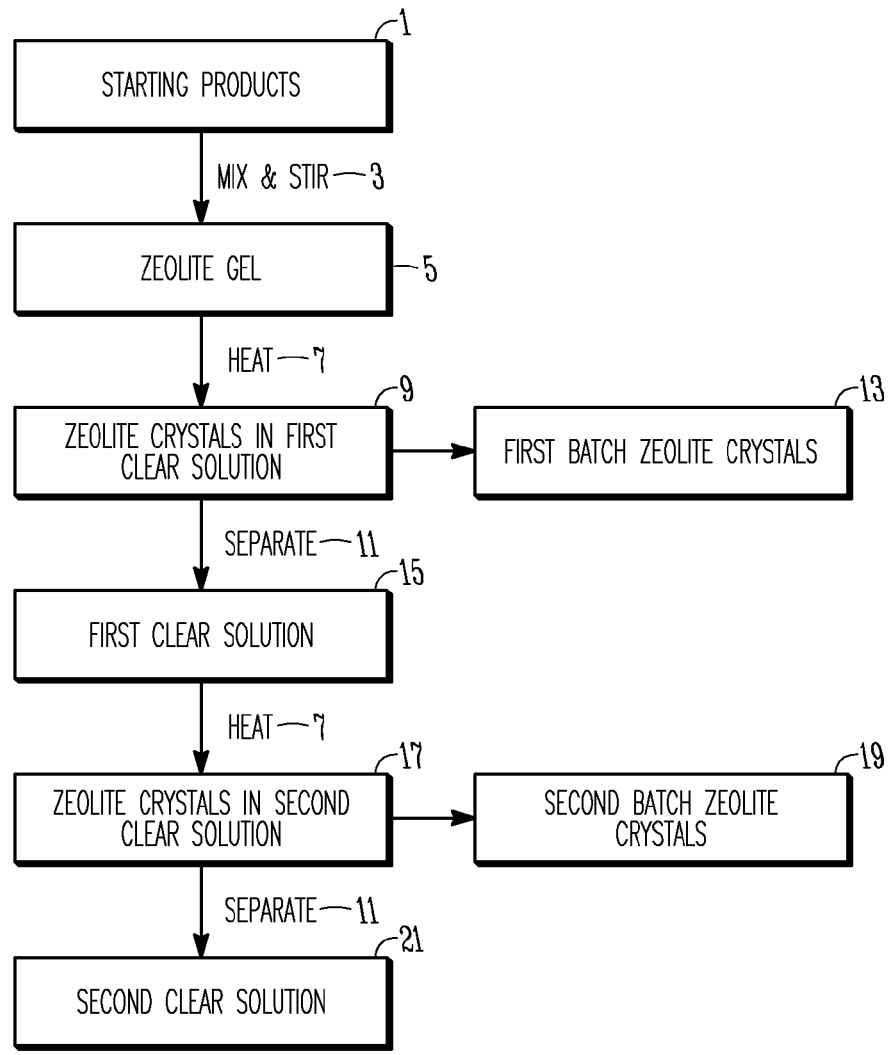
FIG. 1 illustrates a block flow diagram depicting a method for synthesizing nanocrystalline zeolites.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The embodiments of the present invention relate to the synthesis and the use of nanocrystalline zeolites. When describing such methods, the following terms have the following meanings, unless otherwise indicated.

DEFINITIONS

As used herein, "zeolite" refers to hydrous aluminum-sodium silicate in porous granules. Bennett, H. *Concise Chemical and Technical Dictionary*, 4th Ed., New York 1986, p. 1228. Zeolites are crystalline, aluminosilicate molecular sieves with pores of molecular dimensions. Examples of zeolites include silicalite-1 and NaY.

As uses herein, "zeolite gel" refers to a composition capable of forming zeolite crystals. The zeolite gel can contain template molecules and compounds providing silicon and/or aluminum sources.

As used herein, "hydrolysis" or "hydrolyzing" refers to the reaction of salt with water to form an acid and base; decomposition of organic compounds by interaction with water, either in the cold or on heating alone in the presence of acids or alkalis. Bennett, H. *Concise Chemical and Technical Dictionary*, 4th Ed., New York 1986, p. 631.

As used herein, "nanocrystalline" refers to crystals in the range of nanometers. For example, nanocrystalline zeolites can be zeolite crystals with a size smaller than 100 nm.

As used herein, "synthesis" refers to the formation of a chemical compound from more elementary substances. Bennett, H. *Concise Chemical and Technical Dictionary*, 4th Ed., New York 1986, p. 1096. For example, nanocrystalline zeolites can be synthesized from molecules serving as templates, silicon sources, aluminum sources, etc.

As used herein, "clear solution" refers to the zeolite gel solution once a batch of zeolite crystals have been removed. The presence of zeolite crystals creates a cloudy solution, which in turn, becomes clear after the removal of formed zeolite crystals.

As used herein, "separate" or "separating" refers to isolating from a mixture. Gove, Philip Babcock, ed. *Webster's*

*Third New International Dictionary*, Springfield, Mass., 1993 p. 2069. For example, nanocrystalline zeolites can be separated from a clear solution by centrifugation. Separation can also occur by way of other analytical techniques, such as chromatography.

As used herein, "reductant" refers to a substance capable of bringing about the reduction of another substance as it itself is oxidized. A material which can lose electrons. Bennett, H. *Concise Chemical and Technical Dictionary*, 4th Ed., New York 1986, p. 977. For example, urea can be a reductant in a selective catalytic reduction reaction.

As used herein, "starting products" refer to those chemical compounds used in a chemical reaction to bring about some final products of the reaction. For example, starting products can undergo hydrolysis to create final products in a zeolite gel.

As used herein, "reaction products" refer to the final products produced from some chemical reaction. For example, the reaction products of a selective catalytic reduction reaction can be nitrogen gas ($N_2$) and nitrous oxide ($N_2O$).

As used herein, "reactant gases" refer to one or more gases that take part in a chemical reaction. For example, reactant gases in a selective catalytic reduction reaction can be nitric oxide (NO) and nitrogen dioxide ($NO_2$).

As used herein, "deNO$_x$ catalyst" refers to a catalyst for denitrification or reduction of NO$_x$. For example, in a selective catalyst reduction reaction, a deNO$_x$ catalyst facilitates the reduction of harmful gases such as nitric oxide and nitrogen dioxide.

Nanocrystalline Zeolite Synthesis

Referring to FIG. 1, embodiments of the present invention include a method to synthesize nanocrystalline zeolites. Starting products (1) are mixed and stirred (3) to produce a zeolite gel (5). The zeolite gel (5) is heated (7) to obtain zeolite crystals in a first clear solution (9). The zeolite crystals are separated (11) from the first clear solution (15) to obtain a first batch of zeolite crystals (13). The first clear solution (15) is heated (7) to obtain zeolite crystals in a second clear solution (17). The zeolite crystals are separated (11) from the second clear solution (21) to obtain a second batch of zeolite crystals (19).

Organic Template

Most highly siliceous zeolites are formed in the presence of organic bases known as templates or structure directing agents. Organic templates are porous materials that can serve as the structure around which a zeolite can form. In the absence of an organic template, zeolites that form can be too structurally dense to be of any practical use. Examples of organic template compounds are tetrapropyl ammonium hydroxide (TPAOH) ($C_{12}H_{29}O$), tetramethyl ammonium hydroxide (TMAOH) ($C_4H_{13}NO$), tetramethyl ammonium bromide ($C_4H_{12}BrN$), and tetrapropyl ammonium bromide ($C_{12}H_{28}BrN$). TPAOH can be used as an organic template for the formation of silicalite-1 zeolite. TPAOH can be used in an amount by mol percentage of about 0.6-1.8%, preferably about 1.15-1.41%, of the starting products (1). TMAOH can be used as an organic template for the formation of NaY zeolite. TMAOH can be used in an amount by mol percentage of about 0.98-2.94%, preferably about 1.76-2.16%, of the starting products (1). Equivalent organic templates can be found in the Aldrich catalog, incorporated herein by reference. *Aldrich Handbook of Fine Chemicals*, 2003-2004 (Milwaukee, Wis.).

Silicon and Aluminum Sources

Zeolites are generally aluminosilicate structures in which silicon and aluminum are used to form the framework of the molecule (although zeolites can be formed using only silicon, such as silicalite-1). Suitable compounds used as silicon and/or aluminum sources will hydrolyze (decompose with water) to free up silicon and aluminum to form the framework in the zeolite synthesis and subsequent crystal. Examples of silicon sources include, e.g., tetraethylorthosilane (TEOS) ($C_8H_{20}O_4Si$), colloidal or fumed silica (amorphous silica, such as Ludox LS30), and disodium metasilicate ($Na_2O_3Si$). Examples of aluminum sources include, e.g., aluminum isopropoxide ($C_9H_{21}AlO_3$), sodium aluminate ($AlNaO_2$), and aluminum sulfate ($Al_2O_{12}S_3$). TEOS can be used as the silicon source for the formation of silicalite-1 zeolite. TEOS can be used in an amount by mol percentage of about 1.7-5.2%, preferably about 3.1-3.8%, of the starting products (1). TEOS and aluminum isopropoxide can be used as the silicon and aluminum sources, respectively, for the formation of NaY zeolite. TEOS can be used in an amount my mol percentage of about 0.69-2.1%, preferably about 1.23-1.51%, of the starting products (1). Aluminum isopropoxide can be used in an amount by mol percentage of about 0.34-1.03%, preferably about 0.62-0.76%, of the starting products (1). Equivalent silicon and aluminum sources can be found in the Aldrich catalog, incorporated herein by reference. *Aldrich Handbook of Fine Chemicals*, 2003-2004 (Milwaukee, Wis.).

Cation and Base

An additional element of the starting products (1) is a compound, such as sodium hydroxide, that provides the metal cation and also the alkalinity needed for the formation of the zeolite. The sodium cation released forms a part of the zeolite structure by stabilizing the charge and interlocking with the pore structure. Other metal cations (transition metals, alkali and alkaline earth metals, for example) can be used to form a zeolite, but are usually exchanged with sodium after the formation of the zeolite. Potassium hydroxide (KOH) can be an example of a cation and base that can be used in place of sodium hydroxide. Sodium hydroxide can be used in the formation of silicalite-1 zeolite. Sodium hydroxide can be used in an amount by mol percentage of about 0.008-0.024%, preferably about 0.0015-0.0018%, of the starting products (1). Sodium hydroxide can also be used in the formation of NaY zeolites. Sodium hydroxide can be used in an amount by mol percentage of about 0.024-0.071%, preferably about 0.043-0.052%, of the starting products (1). Equivalent cations and bases can be found in the Aldrich catalog, incorporated herein by reference. *Aldrich Handbook of Fine Chemicals*, 2003-2004 (Milwaukee, Wis.).

Solvent

Water is most often used as a solvent to facilitate the formation of zeolites. Water is used in excess and can be used in the formation of silicalite-1 and NaY zeolites. Water can be used in an amount by mol percentage of about 91-99%, preferably about 94-96.5%, of the starting products (1) for silicalite-1. For NaY zeolites, water can be used in an amount by mol percentage of about 91.0-99.0%, preferably about 94.0-98.0%, of the starting products (1).

The starting products (1) are mixed and stirred (3) for a sufficient time and at an appropriate temperature to ensure hydrolysis of the silicon and/or aluminum sources. For example, TEOS can be the silicon source and aluminum isopropoxide can be the aluminum source. Room temperature can be an example of an appropriate temperature for hydrolysis. Overnight, or about 12 hours, can be an example of sufficient time to ensure hydrolysis. Ethanol and iso-propanol are the respective hydrolysis products of TEOS and aluminum isopropoxide. Once hydrolysis has occurred, a zeolite gel (5) can be formed.

Zeolite Gel

The zeolite gel is the clear solution that is produced by the hydrolysis of the silicon and/or aluminum sources of the starting products (1). The stirring and mixing (3) of the starting products (1) ensures hydrolysis and frees up silicon or other metal to form the zeolite framework. Hydrolysis also produces by-products such as ethanol or iso-propanol, which can contribute to the physical properties of the zeolite gel, but do not take part in the formation of the zeolite. For example, in the formation of silicate-1, the hydrolysis of TEOS uses water to free up silicon and produces ethanol as a by-product. Starting products, such as the organic template, the cation/base such as sodium hydroxide, and an excess of water still remain after hydrolysis of the metal source. In the formation of NaY zeolite, the hydrolysis of TEOS frees up silicon and the hydrolysis of aluminum isopropoxide frees up aluminum, in turn, producing ethanol and iso-propanol as by-products, respectively. The ethanol and iso-propanol are then part of the zeolite gel, but do not effectively participate in the formation of the zeolite from the gel.

For silicalite-1 zeolites, the zeolite gel (5) can comprise water, sodium hydroxide (NaOH), tetrapropyl ammonium hydroxide (TPAOH) ($C_{12}H_{29}O$), silicon (Si) and ethanol ($C_2H_6O$). Specifically, the zeolite gel (5) can comprise about 50.0-92.0% water, about 0.012-0.038% sodium hydroxide (NaOH), about 0.72-2.15% tetrapropyl ammonium hydroxide (TPAOH) ($C_{12}H_{29}O$), about 1.99-5.96% silicon (Si) and about 7.95-23.84% ethanol ($C_2H_6O$) by mol percentages. Further, the zeolite gel (5) can comprise about 70.81-86.55% water, about 0.022-0.028% sodium hydroxide (NaOH), about 1.28-1.57% tetrapropyl ammonium hydroxide (TPAOH) ($C_{12}H_{29}O$), about 3.57-4.37% silicon (Si) and about 14.30-17.48% ethanol ($C_2H_6O$) by mol percentages.

For Y zeolites, the zeolite gel (5) can comprise water, sodium (Na), tetramethyl ammonium hydroxide (TMAOH) ($C_4H_{13}NO$), i-propanol ($C_3H_8O$), silicon (Si), aluminum (Al) and ethanol ($C_2H_6O$). Specifically, the zeolite gel (5) can comprise comprises about 74.0-94.0% water, about 0.024-0.071% sodium (Na), about 0.81-2.43% tetramethyl ammonium hydroxide (TMAOH) ($C_4H_{13}NO$), about 1.01-3.03% i-propanol ($C_3H_8O$), about 0.68-2.03% silicon (Si), about 0.34-1.01% aluminum (Al) and about 2.70-8.09% ethanol ($C_2H_6O$) by mol percentages. Further, the zeolite gel (5) can comprise about 80.01-94.00% water, about 0.042-0.052% sodium (Na), about 1.46-1.78% tetramethyl ammonium hydroxide (TMAOH) ($C_4H_{13}NO$), about 1.82-2.22% i-propanol ($C_3H_8O$), about 1.22-1.49% silicon (Si), about 0.60-0.74% aluminum (Al) and about 4.85-5.929% ethanol ($C_2H_6O$) by mol percentages.

The zeolite gel (5) is heated (7) to obtain zeolite crystals in a first clear solution (9). The mechanism for forming zeolite crystals is not clear in the art. The zeolite gel (5) can be heated (7) in a glass flask with a magnetic stirrer, for example. The zeolite gel (5) for silicalite-1 can be heated to about 30-90° C. for about 120-360 hours. For example, about 60° C. and about 240 hours can be used. The zeolite gel (5) for Y zeolite can be heated to about 45-135° C. for about 72-216 hours. For example, about 90° C. and about 144 hours can be used. The formation of zeolites from the zeolite gel can be monitored visually. As the zeolite crystals form, the solution becomes increasingly cloudy. The duration of the heating can depend on reaching the desired cloudiness which would indicate the completion of crystal formation.

Zeolite crystals in a first clear solution (9) are separated (11) to obtain a first batch zeolite crystals (13) and a first clear solution (11). Separation (11) can be accomplished by centrifugation for example. The centrifugation can be accomplished at about 14,000 rpm for about thirty minutes as an example. The first, second and subsequent batches of zeolites can contain from about 75-100%, preferably at least about 85%, of the target zeolite. The undesirable structures formed can be alternative zeolites or some amorphous structure.

The remaining first clear solution (15) can be returned to the original flask and heated to temperatures comparable to those mentioned above, sufficient to provide zeolite crystals in a second clear solution (17). The first, second and subsequent clear solutions contain unused organic template and the remaining starting products necessary for zeolite formation. Further, the recycled solution contains precursor zeolites used as nucleation sites to form zeolites faster than by starting with fresh starting products. The time to form zeolite crystals can be significantly reduced. For example, the first clear solution (15) can be heated for about 24-108 hours. Specifically, the first clear solution (15) can be heated for about 72 hours to form silicalite-1 zeolites and only about 48 hours to form Y zeolites. For Y zeolites, an amount of sodium hydroxide (NaOH) can be contacted with the first clear solution before heating. For example, the amount of sodium hydroxide (NaOH) contacted can be an amount equal to that found in the original zeolite gel.

The zeolite crystals in the second clear solution (17) can be separated (11) sufficient to provide a second batch zeolite crystals (19) and a second clear solution (21). Separation apparatus and methods can be similar to those mentioned above. The second clear solution (21) can be returned to the original flask and heated sufficient to form zeolite crystals in a third clear solution. The steps of separation and formation can be repeated until the clear solution no longer forms zeolite crystals. For NaY zeolites, sodium hydroxide can be contacted with each clear solution as described above.

Cations used as nanocrystalline zeolites can include alkali, alkaline earth, transition metals or any combination thereof. Further, the Si/Al ratio for nanocrystalline can range from about 1.5-5.0.

Example 1

Figure 3:
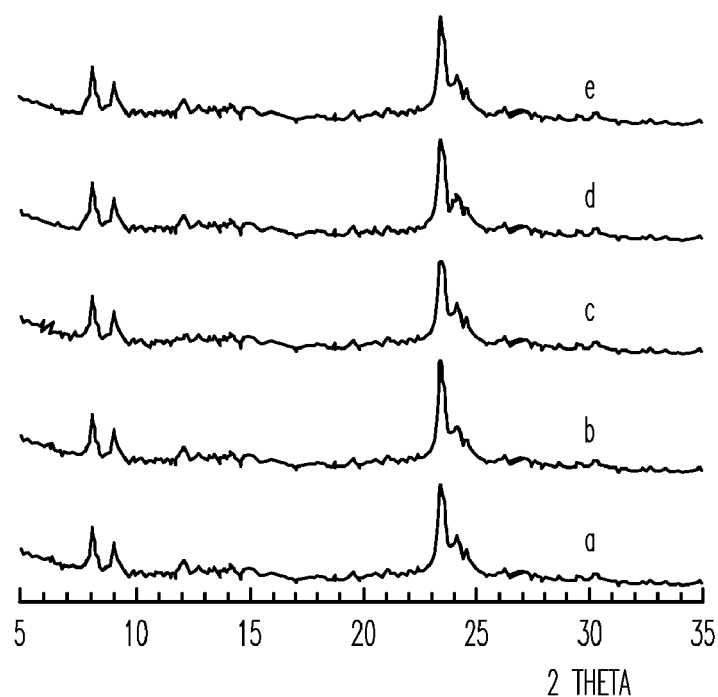
FIG. 3 illustrates X-ray diffraction powder patterns of five consecutive batches of silicate-1 zeolite crystals synthesized from the same synthesis solution.
Figure 4:
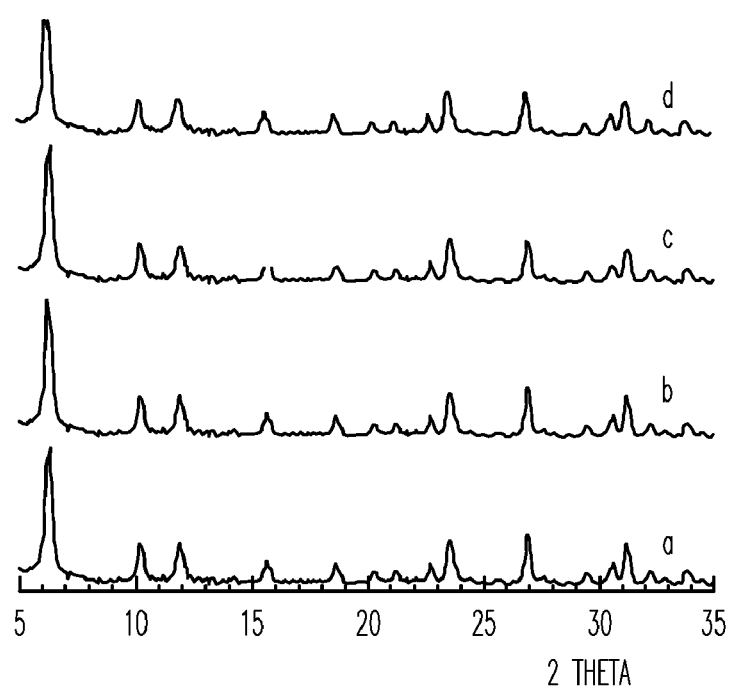
FIG. 4 illustrates X-ray diffraction powder patterns of four selected batches of Y zeolite crystals synthesized from the same synthesis solution.

FIGS. 3 and 4 depict the X-ray diffraction (XRD) powder patterns of silicalite-1 and Y zeolites, respectively, obtained from multiple rounds of zeolite synthesis in which the clear solution recovered after removal of zeolite nanocrystals was reused. The patterns (a)-(e) shown in FIG. 3 correspond to consecutive batches (1-5) of silicalite-1 zeolites. The patterns (a)-(d) shown in FIG. 4 correspond to the first, fourth, seventh and tenth batch of Y zeolites. Each XRD pattern is consistent with the silicalite-1 or Y zeolite structure, respectively. The intensities and line widths of the XRD peaks are similar to each other for each zeolite, suggesting that the different batches of the same zeolite have similar crystal sizes.

The BET surface areas (of as-synthesized samples) and the Si/Al ratios (for Y zeolites) were measured and are listed in FIG. 5 along with the cumulative nanocrystalline zeolite yields for each batch. The zeolite yield was calculated from the initial synthesis solution composition and the mass of the zeolite nanocrystals recovered for each batch. The BET surface area for the as-synthesized zeolite samples which have template still present in the pores represents the external surface area of the nanocrystalline zeolites. The zeolite crystal size can be estimated from the external surface area and the results are listed in FIG. 5.

For silicalite-1, all five batches of synthesis produced roughly the same amount of silicalite-1 crystals with crystal sizes ranges from 20-26 nm. The crystal size of approximately 20 nm is close to the crystal size of 26 nm estimated from the external surface area. After five batches, the total product yield was 42% and the total time elapsed was 22 days. To produce the same amount of silicalite-1 without recycling the synthesis solution would have required approximately 50 days. The attempt for the sixth round failed to produce a colloidal suspension of nanocrystals.

For NaY, the total product yield was 43% after 10 batches and the time elapsed was 24 days. To produce the same amount of Y zeolite without recycling the synthesis solution would have required approximately 60 days. The Si/Al remained approximately constant at 1.8 for each batch and the crystal size ranged from 20-31 nm for the ten batches. The yield from each round was less than 6%, which appears to be limited by the sodium content in the synthesis gel (7% relative to Al content).

Selective Catalytic Reduction (SCR) on Nanocrystalline Zeolites

Figure 2:
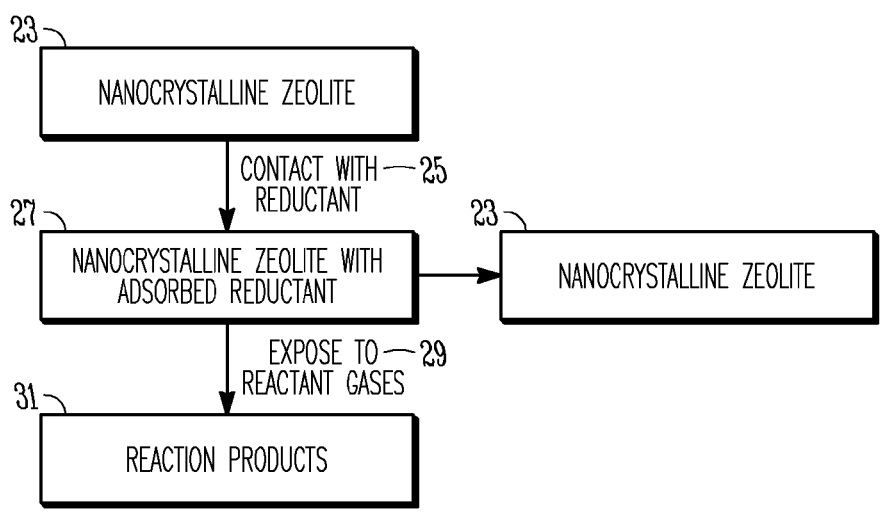
FIG. 2 illustrates a block flow diagram depicting a method for selective catalytic reduction of reactant gases with a nanocrystalline zeolite.

Referring to FIG. 2, embodiments of the present invention include a method to reduce reactant gases by selective catalytic reduction. A nanocrystalline zeolite (23) is contacted with reductant (25) sufficient to obtain a nanocrystalline zeolite with adsorbed reductant (27). A nanocrystalline zeolite with adsorbed reductant (27) is exposed to reactant gases (29) sufficient to provide the nanocrystalline zeolite (23) and reaction products (31).

A nanocrystalline zeolite (23) is contacted with reductant (25) sufficient to obtain a nanocrystalline zeolite with adsorbed reductant (27). A nanocrystalline zeolite can comprise NaY zeolite, for example. Transition metal, alkali and alkaline earth substituted nanocrystalline zeolites can also be used as catalysts for the selective catalyst reduction (SCR) reaction. In the absence of transition metals, zeolite NaY potentially offers novel SCR pathways different from those that occur in transition metal containing catalysts. Nanocrystalline Y zeolites and metal oxides with particle sizes less than about 100 nm, can be particularly useful in environmental applications due to the small crystal sizes and large internal and external surface areas. Urea or ammonia can be used as the reductant, for example. Urea can have broader applications than ammonia as urea is safer to handle and store. Ammonia can be utilized in stationary applications, but urea is more practical for mobile applications.

A nanocrystalline zeolite with adsorbed reductant (27) is exposed to reactant gases (29) sufficient to provide the nanocrystalline zeolite (23) and reaction products (31). The nanocrystalline zeolite (23) acts as the catalyst for reducing pollutant reactant gases to harmless reaction products such as nitrogen gas ($N_2$) and nitrous oxide ($N_2O$). The adsorbed reductant, such as urea, reduces the reactant gases according to the mechanism of selective catalytic reduction (SCR). Reaction products can also include water and by-products of hydrocarbon breakdown, such as carbon dioxide ($CO_2$).

A solution of about 32.5% urea in water can be an example of a precursor for ammonia. Urea thermally decomposes in two steps (reaction 1 and 2) to form ammonia and carbon dioxide.

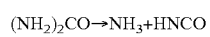 (1)

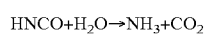 (2)

Silanol groups and Bronsted acid sites on the external surface of nanocrystalline NaY can be effective surface sites for the decomposition of urea to $NH_3$ and the subsequent SCR of $NO_2$.

Example 2

Zeolite Sample Preparation and Materials

Nanocrystalline NaY zeolite was synthesized using clear solutions as discussed above. Sodium hydroxide (NaOH), aluminum isopropoxide, tetramethylammonium hydroxide (TMAOH) and distilled water were mixed and stirred until the resulting mixture became a clear solution. Then tetraethyl orthosilicate (TEOS) was added to the clear solution. The clear solution mixture was stirred overnight to ensure complete hydrolysis of the aluminum and silicon sources. The final clear synthesis gel had the following composition: $0.07Na:2.4TMAOH:1.0Al:2.0Si:132H_2O:3.0i\text{-}PrOH:8.0EtOH$ (mol ratio), the latter two alcohols came about from the hydrolysis of the aluminum isopropoxide and TEOS, respectively. In order to optimize the formation of small NaY crystals, the sodium content was intentionally set too low relative to aluminum content in the synthesis gel. The clear solution was transferred into a 500 ml flask equipped with an air cooled condenser and was heated to T=368 K in an oil bath for 84 hours with stirring. Nanocrystalline Y powders were recovered from the milky, colloidal suspension of NaY after two cycles of centrifugation, washed with deionized water and dried at T=393 K in air. The nanocrystalline NaY sample was calcined at T=773 K under oxygen flow for sixteen hours to remove organic templates.

The synthesized nanocrystalline NaY zeolite and the commercial NaY zeolite purchased from Aldrich were characterized by several different techniques including scanning electron microscopy (SEM), X-ray diffraction (XRD), nitrogen adsorption isotherms and solid state NMR. The average crystal size of nanocrystalline NaY zeolite was determined to be 23 nm. The commercial NaY zeolite is composed of large intergrown NaY crystals with diameters of ~1 μm. The external, internal and total surface areas of nanocrystalline NaY zeolite were determined to be 178, 406 and 584 $m^2/g$, respectively. The total surface area of commercial NaY zeolite was 477 $m^2/g$ and the external surface area of commercial NaY zeolite is estimated from the crystal size to be ~4 $m^2/g$. The Si/Al ratios of nanocrystalline NaY and commercial NaY zeolite were determined to be 1.8 and 2.0, respectively.

Fourier Transform Infrared Spectroscopy 4 mg urea in aqueous solution (~0.3 M) and 7 mg NaY zeolite were mixed and sonicated for 30 minutes at room temperature. The resulting hydrosol was coated onto a 3 cm×2 cm tungsten grid held in place by nickel jaws. The nickel jaws are attached to copper leads so that the sample can be resistively heated. A thermocouple wire attached to the tungsten grid is used to measure the temperature of the sample. The tungsten grid with zeolite sample is placed inside a stainless steel cube. The cube has two $BaF_2$ windows for infrared measurements and is connected to a vacuum/gas handling system.

The stainless steel IR cell is held in place by a linear translator inside the sample compartment of an infrared spectrometer equipped with a narrowband MCT detector. The linear translator allows each half of the sample grid to be moved into the infrared beam path. This allows the detection of gas phase and adsorbed species in zeolites to be obtained under identical reaction conditions. Each absorbance spectrum shown is obtained by referencing 64 scans at an instrument resolution of 4 $cm^{-1}$ to the appropriate background of the zeolite or the blank grid, unless otherwise noted.

The NaY zeolite sample with adsorbed urea was dried in air and evacuated at room temperature overnight to remove weakly adsorbed water. Reactant gases ($NO_2$ and $O_2$) were loaded into the NaY zeolite through the gas handling system. Two absolute pressure transducers were used to monitor the pressure. The extinction coefficient of individual gases was calibrated using the characteristic IR absorption band and measuring the pressure using an absolute pressure transducer. Typically, the NaY zeolite was equilibrated with gases prior to a spectrum being recorded. In SCR reactions, $NO_2$ was first introduced into the IR cell at room temperature. Thirty minutes were allowed for adsorption equilibrium before an excess amount of oxygen was added into the IR cell. Time course experiments were conducted by automatically recording infrared spectra of the gas phase every 60 seconds.

Example 3

Solid State MAS NMR Experiments

Approximately 0.2 g of zeolite was impregnated with an aqueous solution of labeled urea ($^{13}C$ and $^{15}N$). Samples with adsorbed urea were allowed to dry at room temperature and were placed into pyrex sample tubes that were degassed on a vacuum rack. To prepare samples containing labeled urea and nitric oxide and oxygen, the nitric oxide and oxygen were introduced to the zeolite sample while still attached to the vacuum rack. Then, the pyrex sample tube was sealed while the sample was immersed in liquid nitrogen. The sealed samples were heated for 1 hour at the desired temperatures. Samples were allowed to cool to room temperature for the NMR measurements.

Magic angle spinning (MAS) NMR spectra were obtained using a 7 Tesla wide bore Bruker cryomagnet and a TecMag Discovery console. The Larmour frequencies for $^{13}C$ and $^{15}N$ were 75.470 MHz and 30.425 MHz, respectively. A Chemagnetics double-channel 7.5 mm pencil MAS probe was used to spin rotors containing the sealed samples. The spinning speed was approximately 4.0 kHz Single pulse direct excitation was used for $^{13}C$ and $^{15}N$. The $\pi/2$ pulse width was 6.0 μs for $^{13}C$; the $\pi/2$ pulse width was 4.5 μs for $^{15}N$. Recycle delay was 2 s and a line broadening of 50 Hz was used for both $^{13}C$ and $^{15}N$. The number of scans for $^{13}C$ and $^{15}N$ MAS NMR was 4,000 scans and 25,000 scans, respectively. Solid adamantine mixed with KBr (38.5 ppm) and saturated $^{15}NH_4^{15}NO_3$ solution (0 ppm for $NO_3^-$) were used as external chemical shift standards for $^{13}C$ and $^{15}N$, respectively. All of the chemical shifts for $^{13}C$ and $^{15}N$ are reported relative to TMS and $CH_3NO_2$, respectively. All $^{13}C$ and $^{15}N$ spectra were obtained at room temperature.

Results

Adsorption of $NO_2$ in NaY Zeolite at T=298 K

Figure 11:
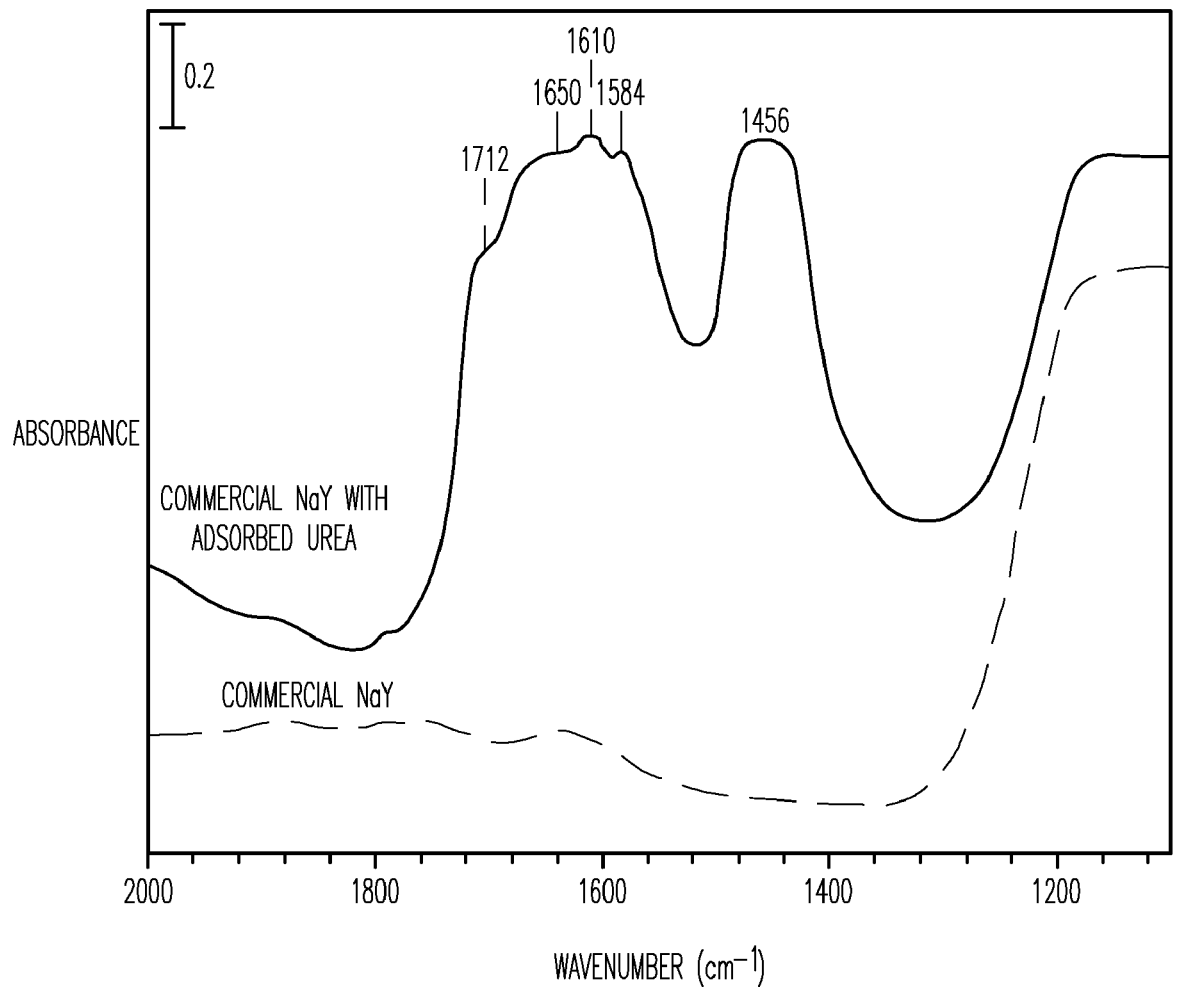
FIG. 11 illustrates a Fourier Transform-Infrared (FT-IR) spectrum of commercial NaY with adsorbed urea.

As discussed above, an aqueous urea solution and the NaY zeolite powder were mixed at room temperature. Prior to adsorbing $NO_2$, the NaY zeolite sample was dried in air and evacuated at room temperature overnight to remove weakly adsorbed water. The FT-IR spectrum of commercial NaY zeolite with adsorbed urea is shown in FIG. 11. The FT-IR spectrum of a clean commercial NaY sample is also plotted in FIG. 11 (dotted line) for comparison.

Adsorbed urea in NaY zeolite can be identified by several absorption bands at 1456, 1584, 1610, 1650 and 1712 $cm^{-1}$ in the FT-IR spectrum shown in FIG. 11. The absorption at 1456 $cm^{-1}$ is assigned to the asymmetric N—C—N stretching mode of adsorbed urea. The absorptions at 1584 and 1610 $cm^{-1}$ are both due to the $NH_2$ bending mode of adsorbed urea. The bands at 1650 $cm^{-1}$ and 1712 $cm^{-1}$ (both C═O stretching mode) can be assigned to urea adsorbed at different sites or different coordination environments in NaY zeolite. Some additional bands in the spectral region 3100-3800 $cm^{-1}$ due to O—H/N—H stretching are also seen (not shown). The general features of the FT-IR spectrum of nanocrystalline NaY zeolite with adsorbed urea (not shown) are similar to those of commercial NaY zeolite, except that there is an increase in the spectral broadening of the peaks. This broadening has been previously attributed to an increase in site heterogeneity for nanocrystalline zeolite samples.

The NaY sample with adsorbed urea was then exposed to 0.5 Torr pressure of $NO_2$ at room temperature and was equilibrated for 30 min. The changes in the FT-IR spectra of NaY sample upon exposure to $NO_2$ are clearly seen in the difference spectra shown in FIG. 12. Each difference spectrum was obtained by subtracting the spectrum of NaY zeolite before adsorbing $NO_2$ from the corresponding spectrum after the adsorption equilibrium. As shown in the difference FT-IR spectrum of commercial NaY zeolite (FIG. 12), several absorption bands appeared at 1272, 1372, 1514 and 1770 $cm^{-1}$. The absorption bands at 1272 and 1372 $cm^{-1}$ are attributed to the formation of nitrite and nitrate on $Na^+$ sites, respectively. The appearance of two absorption peaks at 1514 $cm^{-1}$ ($v_{CN}+\delta_{NH}$) and 1770 $cm^{-1}$ ($v_{CO}$) indicate the formation of a surface species with a linear imido structure (e.g. —(C═O)—NH—(C═O)—). The simultaneous loss in intensity of the bands around 1456 and 1650 $cm^{-1}$ was observed, indicating that adsorbed urea reacted with $NO_2$ (or surface species generated in $NO_2$ adsorption).

Figure 12:
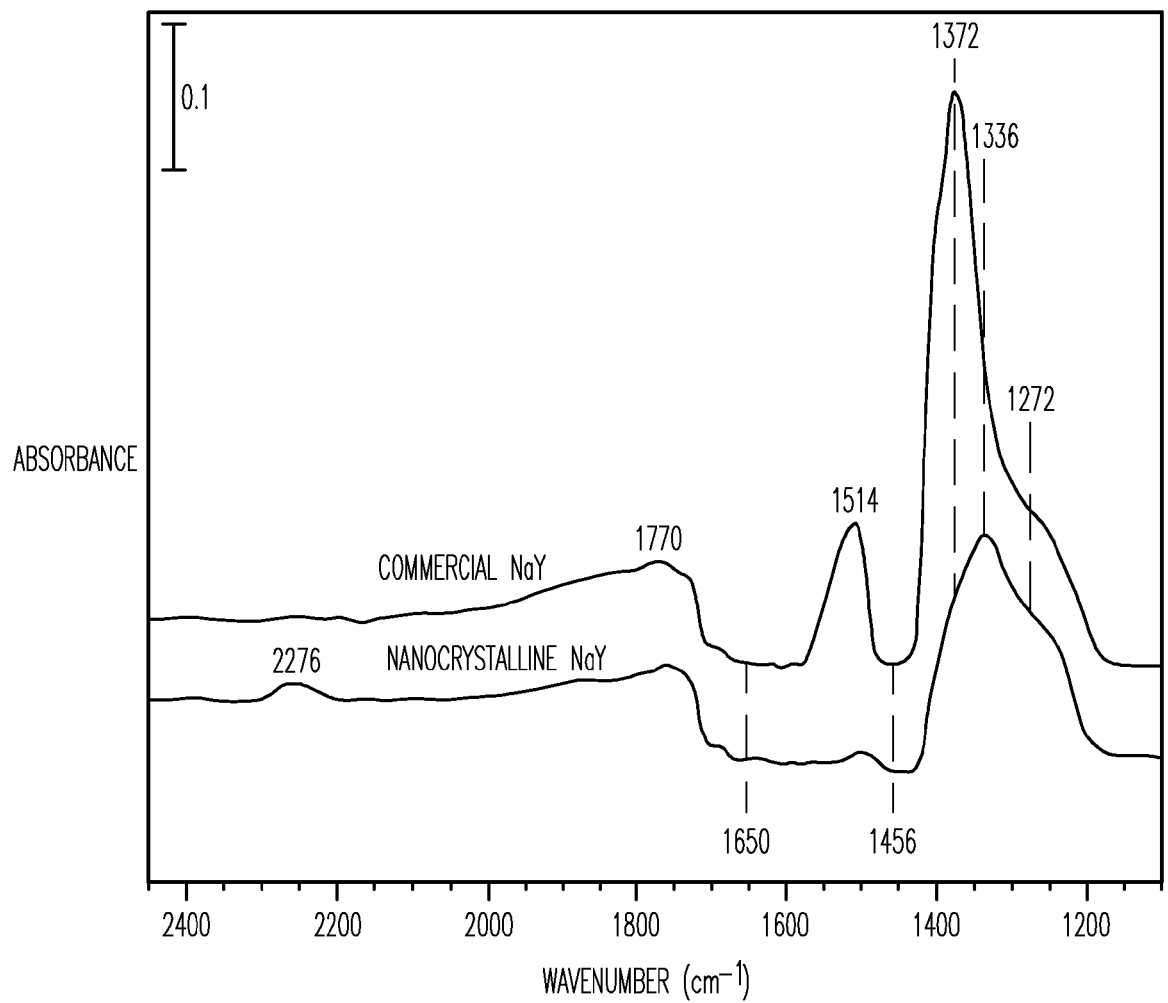
FIG. 12 illustrates FT-IR difference spectra of nanocrystalline NaY with adsorbed urea and commercial NaY zeolite with adsorbed urea following adsorption of $NO_2$.

The difference FT-IR spectrum of nanocrystalline NaY with adsorbed urea after being exposed to $NO_2$ is shown in FIG. 12 (bottom). Similar to the commercial NaY zeolite, the formation of nitrite (1272 $cm^{-1}$) and disappearance of adsorbed urea (1456 and 1650 $cm^{-1}$) were observed for nanocrystalline NaY zeolite. However, several differences were observed between the spectra of nanocrystalline NaY zeolite and commercial NaY zeolite. For example, the formation of the surface species with the linear imido structure (1514 and 1770 $cm^{-1}$) occurs to a much less extent in nanocrystalline NaY (FIG. 12). Furthermore, $NO_2$ adsorption in nanocrystalline NaY zeolite resulted in the formation of nitrate adsorbed on external (vide infra) EFAL sites (1336 $cm^{-1}$) as well as nitrate on internal $Na^+$ sites (1372 $cm^{-1}$). Finally, the formation of isocyanic acid (HNCO) adsorbed on EFAL sites is observed in nanocrystalline NaY zeolite, as indicated by a broad absorption band around 2276 $cm^{-1}$. In $NO_2$ adsorption at room temperature, the formation of surface adsorbed isocyanic acid is not appreciable in commercial NaY zeolite (FIG. 12). Previous studies of pyridine adsorption coupled with infrared analysis indicate that EFAL sites are located on the external surface of nanocrystalline NaY zeolite and are not present to any great extent in the commercial NaY sample due to its low external surface area.

Figure 13:
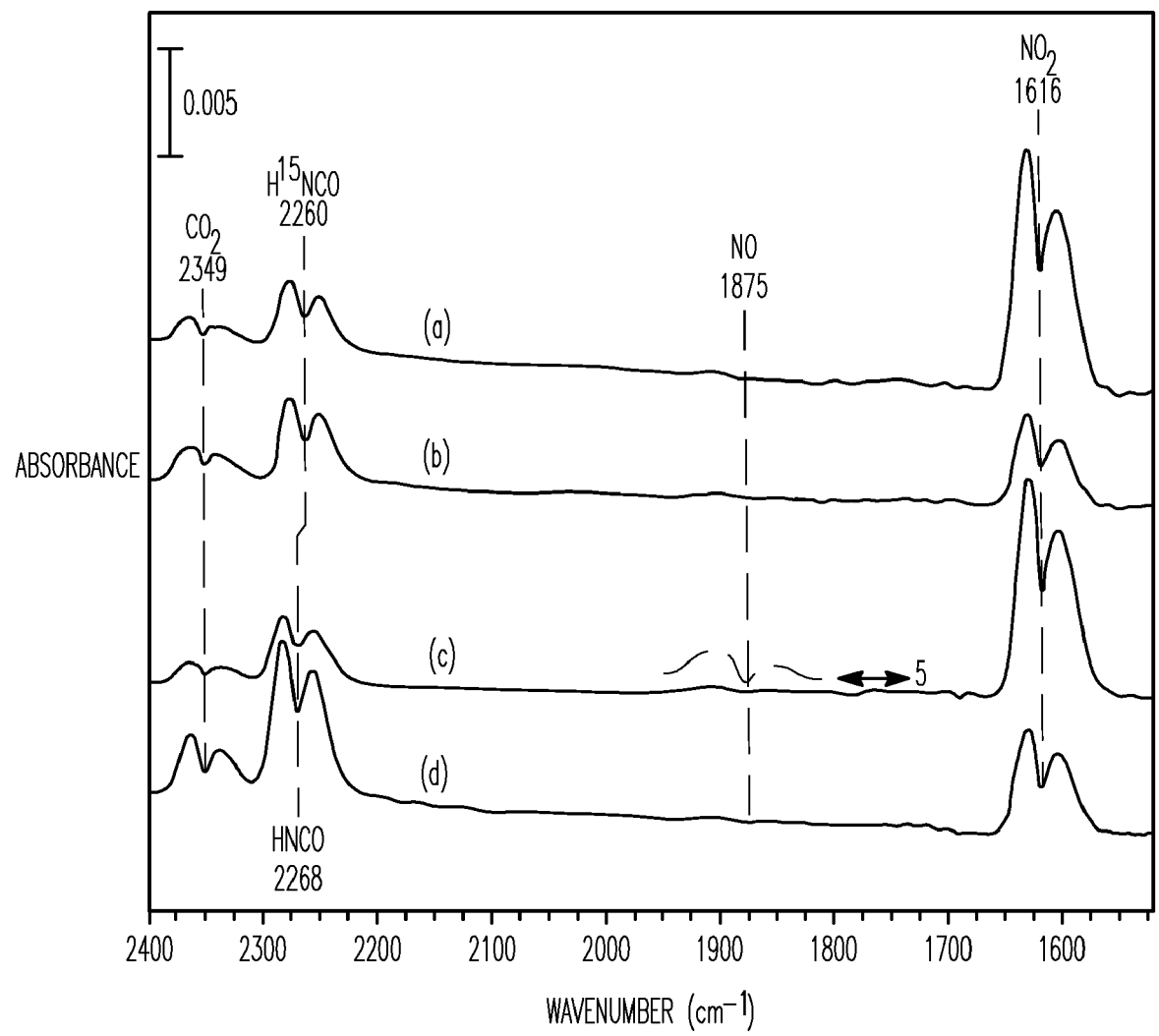
FIG. 13 illustrates FT-IR spectra of the gas phase upon adsorption of $NO_2$ in commercial NaY zeolite with adsorbed $^{15}N$-urea, nanocrystalline NaY zeolite with adsorbed $^{15}N$-urea, commercial NaY zeolite with adsorbed unlabeled urea, and nanocrystalline NaY zeolite with adsorbed unlabeled urea.

Unlabeled urea and $^{15}N$ labeled urea were used in SCR reactions over both nanocrystalline NaY and commercial NaY zeolite. Compared to the FT-IR spectrum of NaY zeolite with unlabeled urea, several differences were observed when $^{15}N$-urea solution was mixed with the zeolite sample. For example, the absorption band for adsorbed $H^{15}NCO$ shifts from 2276 $cm^{-1}$ to 2258 $cm^{-1}$ when nanocrystalline NaY with adsorbed $^{15}N$-urea was exposed to $NO_2$ at room temperature (not shown). A similar isotopic shift was also observed for gas-phase HNCO. The FT-IR spectra of the gas phase after $NO_2$ adsorption in commercial and nanocrystalline NaY zeolite with unlabeled urea and $^{15}N$-urea are shown in FIG. 13. Gas-phase $NO_2$ (1616 cm$^{-1}$), NO (1875 cm$^{-1}$), HNCO (2268 cm$^{-1}$) and $CO_2$ (2349 cm$^{-1}$) were observed when NaY zeolite with adsorbed urea was exposed to $NO_2$ at room temperature. For gas-phase HNCO, an isotopic shift of 8 cm$^{-1}$ was observed on substituting $^{15}N$ for $^{14}N$. The complete list of isotopic shifts for nitrogen-containing gas-phase and adsorbed species is given in FIG. 6 and will be discussed in detail in later sections. In the spectra shown in FIG. 13, the absorption band for gas-phase $NO_2$ over nanocrystalline NaY zeolite is less intense than that over commercial NaY, indicating that more $NO_2$ was adsorbed/reacted with nanocrystalline NaY zeolite relative to commercial NaY. This is consistent with our previous observation that nanocrystalline NaY zeolite has a greater adsorption capacity for $NO_2$ relative to commercial NaY zeolite.

Urea-SCR of $NO_2$ in NaY Zeolite at T=473 K: Gas-Phase Products

An excess amount of $O_2$ was introduced into the IR cell after the NaY zeolite sample was equilibrated with $NO_2$ for 30 min at room temperature. Urea-SCR of $NO_2$ was then carried out at T=473 K. A control experiment was also done by heating the commercial NaY zeolite with adsorbed urea at T=473 K in the presence of oxygen.

Figure 14:
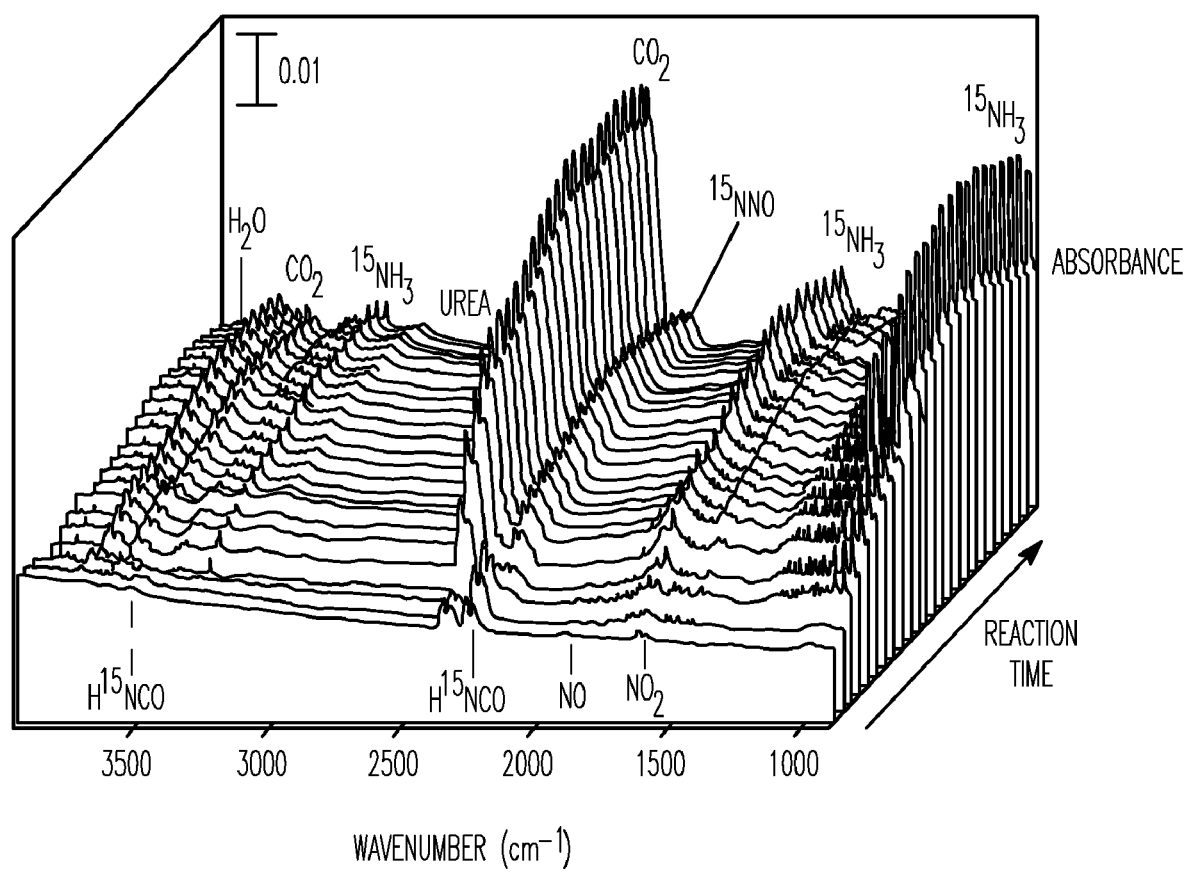
FIG. 14 illustrates FT-IR spectra of the gas phase as a function of reaction time in $^{15}N$-urea SCR of $NO_2$ over nanocrystalline NaY zeolite.

FIG. 14 shows the FT-IR spectra of gas-phase species formed during the first 30 minutes of $^{15}N$-urea SCR over nanocrystalline NaY zeolite at T=473 K. In the beginning of the SCR reaction (t=0), gas-phase $NO_2$, NO, H$^{15}$NCO, $CO_2$ and a small amount of $H_2O$ were observed in the FT-IR spectrum. At t=1 min, more $H_2O$ and H$^{15}$NCO appeared in the gas phase as shown by the spectra (FIG. 14). Gas-phase H$^{15}$NCO decayed quickly after t=2 minutes. Several additional changes in the gas phase composition can be seen in these time course experiments, including the rapid production of $^{15}NH_3$ (927, 960, 1623 and 3331 cm$^{-1}$) and $CO_2$ at t=2 min. Gas-phase $^{15}N$-urea appeared and is identified by several characteristic absorptions including three broad bands between 3100 and 3520 cm$^{-1}$ and several absorptions between 1290 and 1720 cm$^{-1}$ in the FT-IR spectra shown in FIG. 14. Furthermore, gas-phase $NO_2$ disappeared quickly relative to the concentration of NO. $^{15}$NNO (2201 and 1270 cm$^{-1}$) appeared in these spectra as the only isomer of $N_2O$ (FIG. 6). Other isomers of $N_2O$ such as N$^{15}$NO and $^{15}N_2O$ have different absorption frequencies (2178/1280 cm$^{-1}$ for N$^{15}$NO and 2155/1265 cm$^{-1}$ for $^{15}N_2O$) and were not detected in our experiments. The formation of $^{15}$NNO in the gas phase indicates that N—N bond formation occurred at room temperature between a $^{15}N$-atom from urea and a $^{14}N$-atom from $NO_2$ and that the N=O bond in $NO_2$ remains intact during the formation of $^{15}$NNO. There was no significant change in the gas phase after 30 minutes of SCR reactions over nanocrystalline NaY zeolite.

Figure 15:
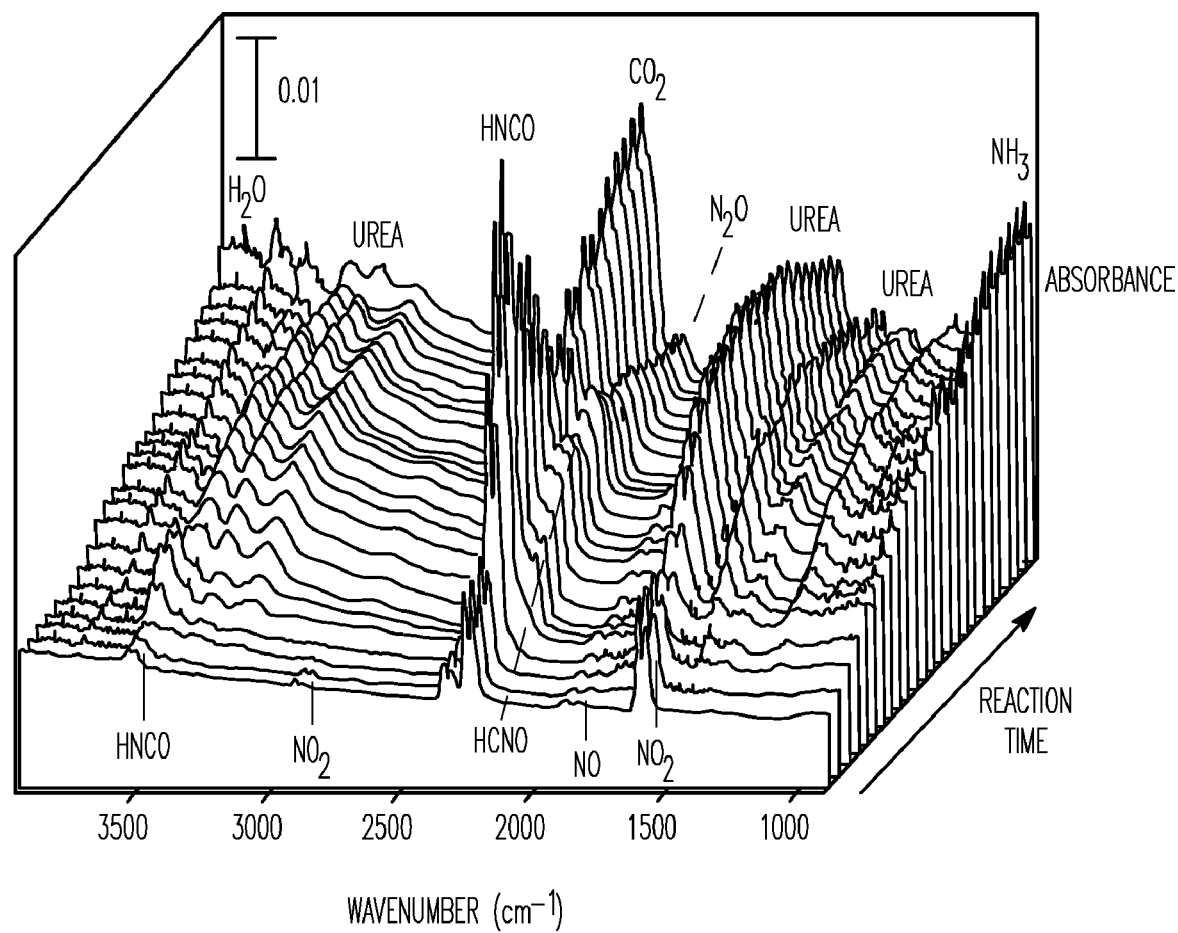
FIG. 15 illustrates FT-IR spectra of the gas phase as a function of reaction time in urea-SCR of $NO_2$ over commercial NaY zeolite.

Compared to the SCR reaction in nanocrystalline NaY zeolite, the urea-SCR of $NO_2$ in commercial NaY zeolite was much slower. The FT-IR spectra of the gas phase species present during the 2 hours of urea-SCR over commercial NaY zeolite are shown in FIG. 15. Similar to the spectra over the nanocrystalline NaY, $NO_2$, NO, HNCO, $CO_2$ and a small amount of $H_2O$ were among the detectable gas-phase species present before the SCR reaction started (t=0). $NO_2$ disappeared quickly, but NO persisted in the gas phase during the two-hour reaction period. More gas-phase HNCO and $H_2O$ appeared immediately after the heating began. The concentration of HNCO reached a maximum at t=5 min and HNCO remained detectable in the IR cell for at least 60 minutes during the SCR reaction process (FIG. 15). Compared to nanocrystalline NaY, a larger amount of gas-phase urea appeared over commercial NaY zeolite. There was an induction period (~3 min) for the production of $NH_3$ and $CO_2$ which did not appear in the gas phase with significant concentrations until t=4 min (FIG. 15). $N_2O$ appeared as one of final products in gas phase. It should be noted that a gas-phase species with an absorption around 2185 cm$^{-1}$ was present in the FT-IR spectra from t=4 min to 10 min. Since another absorption band at 1255 cm$^{-1}$ was also observed, this species is assigned to formonitrile oxide (HCNO). Further supporting the assignment is the fact that HCNO (2190 and 1255 cm$^{-1}$) was produced in the presence of a large amount of HNCO during the thermal decomposition of urea at T=473 K in commercial NaY zeolite (not shown).

Figure 16:
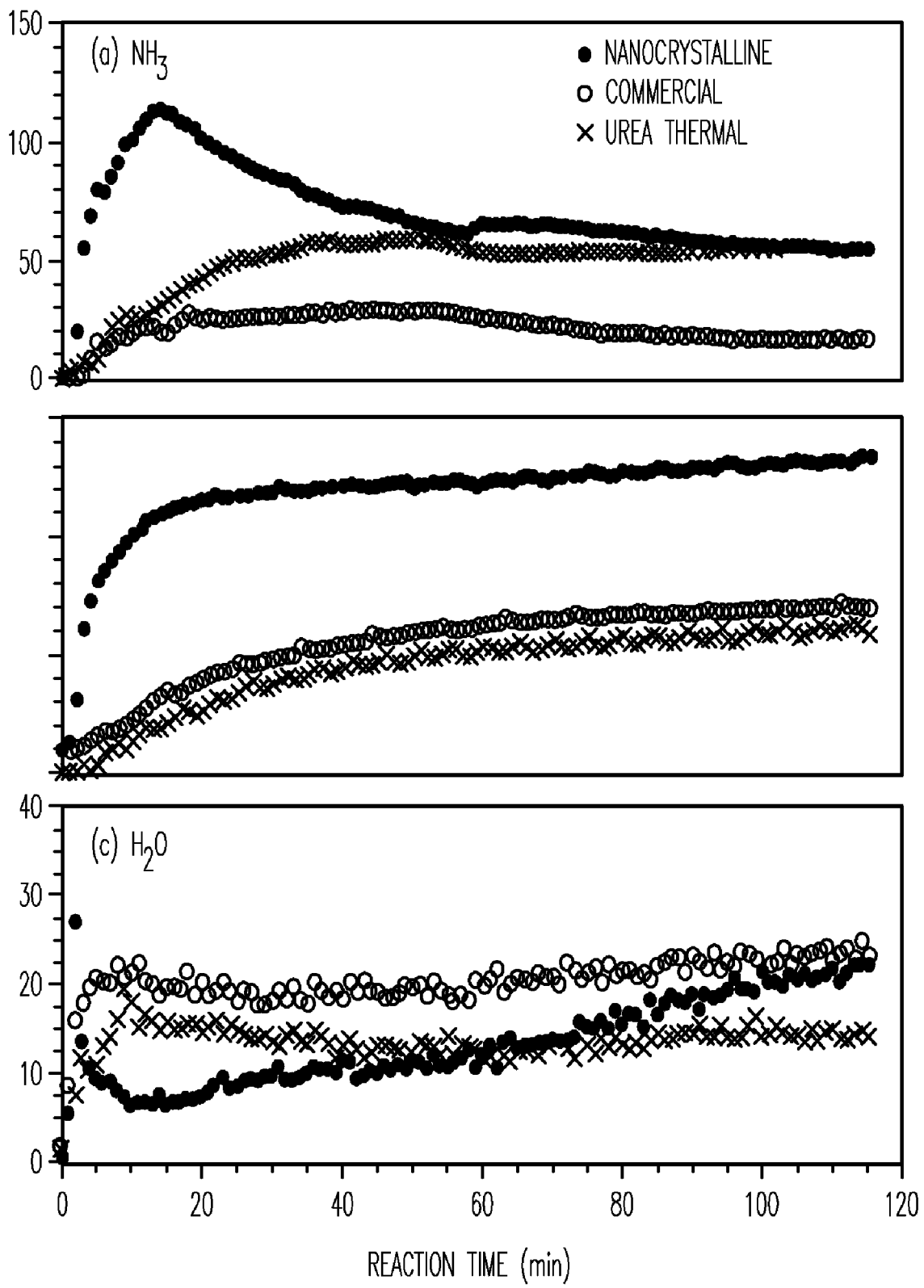
FIG. 16 illustrates charts depicting the evolution of gas-phase $NH_3$, $CO_2$ and $H_2O$ during urea-SCR of $NO_2$ in nanocrystalline NaY zeolite, urea-SCR of $NO_2$ in commercial NaY zeolite and thermal decomposition of urea in commercial NaY zeolite.

The time course concentrations of the gases in the infrared cell can be determined from the integrated absorbance of the corresponding bands using calibrated extinction coefficients, as described in previous work. The time course concentrations of gas-phase $NH_3$, $CO_2$ and $H_2O$ in urea-SCR of $NO_2$ are shown in FIG. 16(a), 16(b) and 16(c), respectively. The time course concentrations for the urea thermal decomposition over commercial NaY zeolite are also included in FIG. 16.

In urea-SCR of $NO_2$ using nanocrystalline NaY zeolite as the catalyst, the concentration of $NH_3$ in the gas phase initially increased until a maximum was reached at approximately t=15 min (FIG. 16(a)). The concentration of $NH_3$ then gradually decreased and the remained at a constant level at approximately 55 μmol L$^{-1}$. The concentration of $CO_2$ also increased quickly during the first 15 minutes after the urea-SCR of $NO_2$ in nanocrystalline started (FIG. 16(b)). The concentration of gas-phase $H_2O$ rapidly increased to a maximum at t=2 min, then decreased sharply until a minimum was reached at approximately t=15 min and started increasing again thereafter (FIG. 16(c)). Most likely, strongly adsorbed water that remained in nanocrystalline NaY zeolite was released initially upon heating to T=473 K, followed by the consumption and production of $H_2O$ in SCR reactions.

In urea-SCR of $NO_2$ over commercial NaY zeolite, the changes in concentrations of $NH_3$, $CO_2$ and $H_2O$ are quite different relative to the corresponding ones in nanocrystalline NaY zeolite (FIG. 16). For example, the concentration of $NH_3$ during urea-SCR over commercial NaY zeolite increased slowly, remained at a concentration lower than 30 μmol L$^{-1}$ and decreased after t=60 min (FIG. 16(a)). The final concentration of $CO_2$ over commercial NaY zeolite was about half of the final concentration over nanocrystalline NaY zeolite (FIG. 16(b)). The concentration of $H_2O$ in the gas phase during urea-SCR over commercial NaY zeolite increased initially and changed slightly after t=10 min (FIG. 16(c)). In the thermal decomposition of urea over commercial NaY zeolite, the concentration of $NH_3$ increased until a maximum was reached at t=40 min and only slightly changed thereafter (FIG. 16(a)). The time course concentrations of $CO_2$ and $H_2O$ in the thermal decomposition of urea are just slightly lower than those in urea-SCR of $NO_2$ over commercial NaY zeolite (FIGS. 16(b) and 16(c)).

Figure 17:
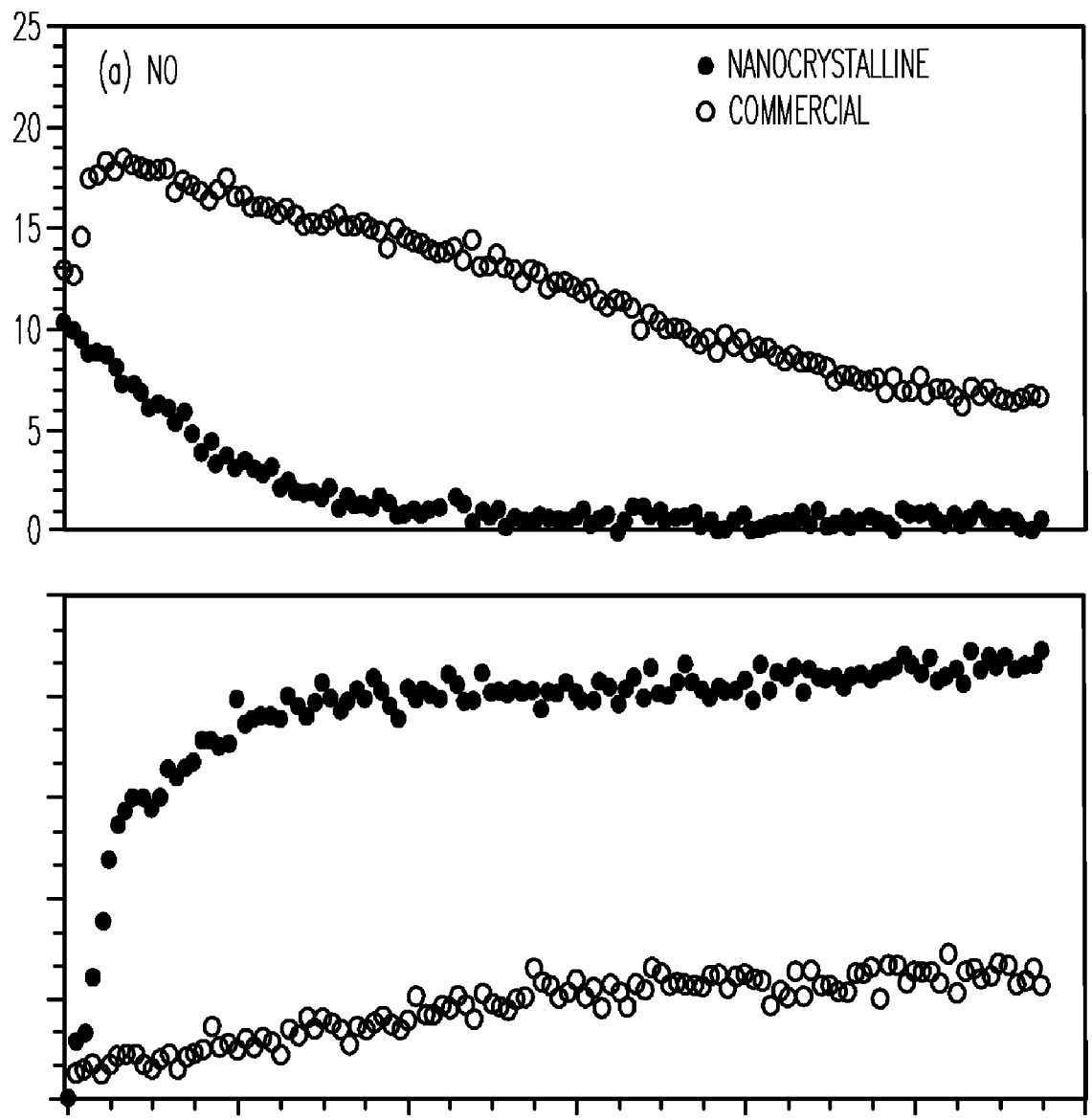
FIG. 17 illustrates charts depicting the evolution of gas-phase NO and $N_2O$ during urea-SCR of $NO_2$ in nanocrystalline NaY zeolite and in commercial NaY zeolite.

The time course concentrations of NO and $N_2O$ in the gas phase are shown in FIGS. 17(a) and 17(b), respectively. In urea-SCR of $NO_2$ over nanocrystalline NaY zeolite, the concentration of NO decreased monotonically and gas-phase NO completely disappeared around t=40 min (FIG. 17(a)). When commercial NaY zeolite was used as the SCR catalyst, the concentration of NO initially increased until a maximum and decreased slowly thereafter. The time course concentration of $N_2O$ demonstrates that $N_2O$ was produced more quickly and in much higher concentration in nanocrystalline NaY zeolite than in commercial NaY zeolite (FIG. 17(b)).

The initial rates for formation of gas-phase $NH_3$, $CO_2$ and $N_2O$ and loss of gas-phase NO can be obtained by linear fitting of the concentrations of individual gas-phase species in the beginning of the reactions, as listed in FIG. 7. In urea-SCR of $NO_2$ over nanocrystalline NaY zeolite, the initial rate of $NH_3$ formation is slightly higher than the initial formation rate of $CO_2$. Time course concentrations of $NH_3$ (FIG. 16(a)) and $CO_2$ (FIG. 16(b)) in the first 15 minutes of SCR reactions also indicate that the amount of $NH_3$ released into the gas phase is almost the same as the amount of $CO_2$. In the thermal reaction of urea over commercial NaY zeolite, the ratio of $NH_3$ formation rate to $CO_2$ formation rate is close to 2:1, which matches the fact that 1 mole of urea thermally decomposes into 2 moles of $NH_3$ and 1 mole of $CO_2$ (reactions 1 and 2). Furthermore, the initial rates for $NH_3$ and $CO_2$ formation are much higher in nanocrystalline NaY than in commercial NaY. FIG. 7 also includes the initial rates of $N_2O$ formation and NO loss. It can be concluded from the data listed in FIG. 7 that urea-SCR of $NO_2$ occurred more quickly in nanocrystalline NaY than in commercial NaY zeolite.

FIG. 8 summarizes the product distribution in the gas phase after urea-SCR of $NO_2$ and thermal reaction of urea. In nanocrystalline NaY zeolite, the concentrations of $NH_3$ and $CO_2$ after SCR reaction are much higher than in commercial NaY zeolite. In addition, urea-SCR of $NO_2$ over nanocrystalline NaY zeolite resulted in 100% $NO_x$ ($NO_2$ and NO) conversion and higher selectivity toward $N_2O$ formation relative to commercial NaY zeolite. Based on mass balance for nitrogen, more than 80% of $NO_2$ was converted into $N_2$ in urea-SCR over nanocrystalline NaY zeolite at T=473 K (FIG. 8). Although about 17% of $NO_2$ was converted into $N_2O$ in urea-SCR reactions over nanocrystalline NaY zeolite, it was observed that $N_2O$ could be reduced into $N_2$ in nanocrystalline NaY zeolite at higher temperatures, which are more practical for typical engine operation.

Adsorbed Products Following Urea-SCR of $NO_2$ in NaY Zeolite at T=473 K

Figure 18:
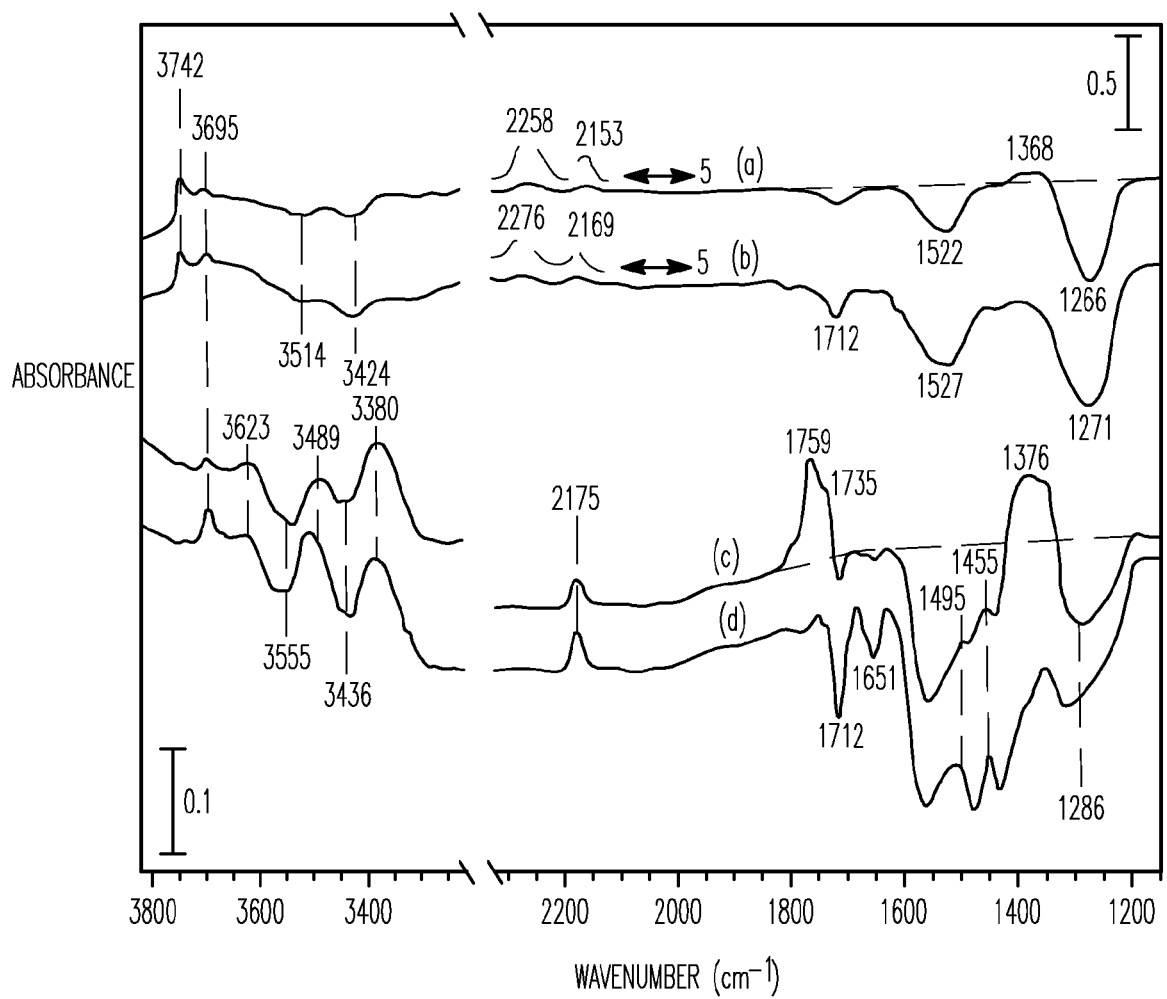
FIG. 18 illustrates FT-IR difference spectra of zeolite samples following $^{15}N$-urea SCR of $NO_2$ in nanocrystalline NaY for 30 minutes, urea-SCR of $NO_2$ in nanocrystalline NaY for 2 hours, urea-SCR of $NO_2$ in commercial NaY for 2 hours and thermal decomposition of urea in commercial NaY for 2 hours.

Besides kinetics studies, infrared analysis of surface adsorbed intermediates or products can assist in understanding the mechanism for urea-SCR of $NO_2$. Difference FT-IR spectra of nanocrystalline NaY and commercial NaY zeolite after urea-SCR of $NO_2$ are shown in FIG. 18. The difference FT-IR spectrum of nanocrystalline NaY zeolite after $^{15}$N-urea SCR of $NO_2$ and commercial NaY zeolite after thermal reaction of urea are also shown. The zeolite samples were cooled back to room temperature prior to recording the spectra. It was observed that most gas-phase $NH_3$, $H_2O$ and urea disappeared from the gas phase after cooling the zeolites back to room temperature due to adsorption in the zeolite samples.

In urea-SCR of $NO_2$ over nanocrystalline NaY zeolite, the formation of adsorbed HNCO and $OCN^-$ can be identified by the absorption bands at 2276 $cm^{-1}$ and 2169 $cm^{-1}$, respectively, in the FT-IR spectra shown in FIG. 18(b). The loss of adsorbed urea, characterized by the negative absorptions at 1271, 1527, 1712 $cm^{-1}$ ($v_{CO}$), 3424 and 3514 $cm^{-1}$ (both $v_{NH}$), can be seen as well in the spectrum. The absorption band at 1527 $cm^{-1}$ is assigned to the CNH bend-stretch mode where the nitrogen and hydrogen move in opposite directions relative to the carbon, while the absorption band at 1271 $cm^{-1}$ is assigned to the CNH open-stretch mode where N and H atoms move in the same direction relative to the carbon. In addition, the recovery of silanol groups (3742 $cm^{-1}$) and OH groups attached to $Na^+$ (3695 $cm^{-1}$) are evident in the spectrum of nanocrystalline NaY zeolite shown in FIG. 18(b). This indicates that adsorption and SCR reactions occurred to a significant extent on the external surface since silanol groups are mainly present on the external surface of the nanocrystalline NaY zeolite.

The difference FT-IR spectrum of nanocrystalline after $^{15}$N-urea SCR of $NO_2$ for 30 min (FIG. 18(a)) is similar to that after urea-SCR for 2 h (FIG. 18(b)). The formation of adsorbed $H^{15}NCO$ (2258 $cm^{-1}$) and $OC^{15}N^-$ (2153 $cm^{-1}$) as well as the loss of adsorbed $^{15}N$-urea (1522 and 1266 $cm^{-1}$) are apparent in the spectrum. The isotopic shifts for these nitrogen-containing species are apparent in the spectra and are listed in FIG. 6. In the spectrum shown in FIG. 18(a), a dotted baseline is drawn in the range between 1200 and 1800 $cm^{-1}$, revealing that a small amount of nitrate remained in nanocrystalline NaY zeolite after 30 min of SCR reactions at T=473 K.

When commercial NaY zeolite was used as the SCR catalyst, the loss of adsorbed urea was observed, as indicated by the negative absorption bands at 1286 $cm^{-1}$ ($v_{CNH}$), 1651, 1712 $cm^{-1}$ (both $v_{C=O}$), 3436 and 3555 $cm^{-1}$ (both $v_{NH}$) in the spectrum of commercial NaY zeolite after urea-SCR reactions (FIG. 18(c)). The other CNH vibration which should fall between 1400 and 1600 $cm^{-1}$ can be less pronounced in the spectrum due to the formation of two absorption bands at 1455 and 1495 $cm^{-1}$ (FIG. 18(c)). The two absorption bands at 1455 and 1495 $cm^{-1}$ are assigned to the bending mode of adsorbed ammonium ion and stretching mode of surface species containing imine groups (C=NH), respectively. In the spectrum shown in FIG. 18(c), the corrected baseline (dotted line) in the range between 1200 and 1800 $cm^{-1}$ clearly demonstrates the formation of adsorbed biuret (1759 $cm^{-1}$) and cyanuric acid (1735 $cm^{-1}$) in commercial NaY zeolite after SCR reactions. Furthermore, surface $OCN^-$ (2175 $cm^{-1}$) and nitrate (1376 $cm^{-1}$) were observed after urea-SCR of $NO_2$ for 2 hours in commercial NaY zeolite. In the OH/NH stretching region (FIG. 18(c)), the absorptions in the spectrum of commercial NaY zeolite indicate the formation of OH group on $Na^+$ (3695 $cm^{-1}$), surface adsorbed $H_2O$ (3623 $cm^{-1}$) and NH-containing species (3220, 3380, 3489 $cm^{-1}$) as well as the loss of adsorbed urea (3436 and 3555 $cm^{-1}$). The FT-IR spectrum of commercial NaY zeolite after thermal reaction of urea is almost the same as the spectrum after urea-SCR of $NO_2$, except that the formation of nitrate, biuret or cyanuric acid are not observed in the thermal decomposition of urea (FIG. 18(d)).

The comparison between the difference FT-IR spectra of the zeolite samples after urea-SCR of $NO_2$ for 2 hours indicates that higher conversion of nitrate was achieved in nanocrystalline NaY zeolite than in commercial NaY zeolite. This is consistent with the fact that urea-SCR of $NO_2$ is much slower in commercial NaY than in nanocrystalline NaY, as mentioned previously (FIG. 7). Furthermore, undesired surface products (biuret and cyanuric acid) were observed in commercial NaY zeolite after urea-SCR of $NO_2$ but not in nanocrystalline NaY zeolite.

The assignments of absorption bands in FT-IR spectra shown in FIG. 18 are further supported by isotopic studies (FIG. 6). The absorption frequencies for HNCO and $OCN^-$ in nanocrystalline NaY zeolite are different from those in commercial NaY zeolite. In nanocrystalline NaY, HNCO (2276 $cm^{-1}$) and $OCN^-$ (2169 $cm^{-1}$) most likely adsorbed on EFAL sites. In commercial NaY zeolite, $OCN^-$ is characterized by the relatively intense absorption band at 2175 $cm^{-1}$ in the FT-IR spectrum shown in FIG. 18(c) and most likely attached to $Na^+$ sites. In nanocrystalline NaY zeolite, the isotopic shift for the CNH vibration mode of adsorbed urea (5 $cm^{-1}$) is exactly the same as that for the $NH_3$ deformation mode of gas-phase $NH_3$. This suggests that urea adsorbed in nanocrystalline NaY zeolite in a way such that at least one $NH_2$ group was almost unperturbed. In commercial NaY zeolite, the isotopic shift for the C=O stretching mode of adsorbed biuret and cyanuric acid (8 cm$^{-1}$) is the same as that for the NCO stretching mode of gas-phase HNCO. This can be due to the configuration exchange —(C=O)—NH— ⇌ —C(OH)=N— in adsorbed biuret and cyanuric acid in commercial NaY zeolite.

Figure 19:
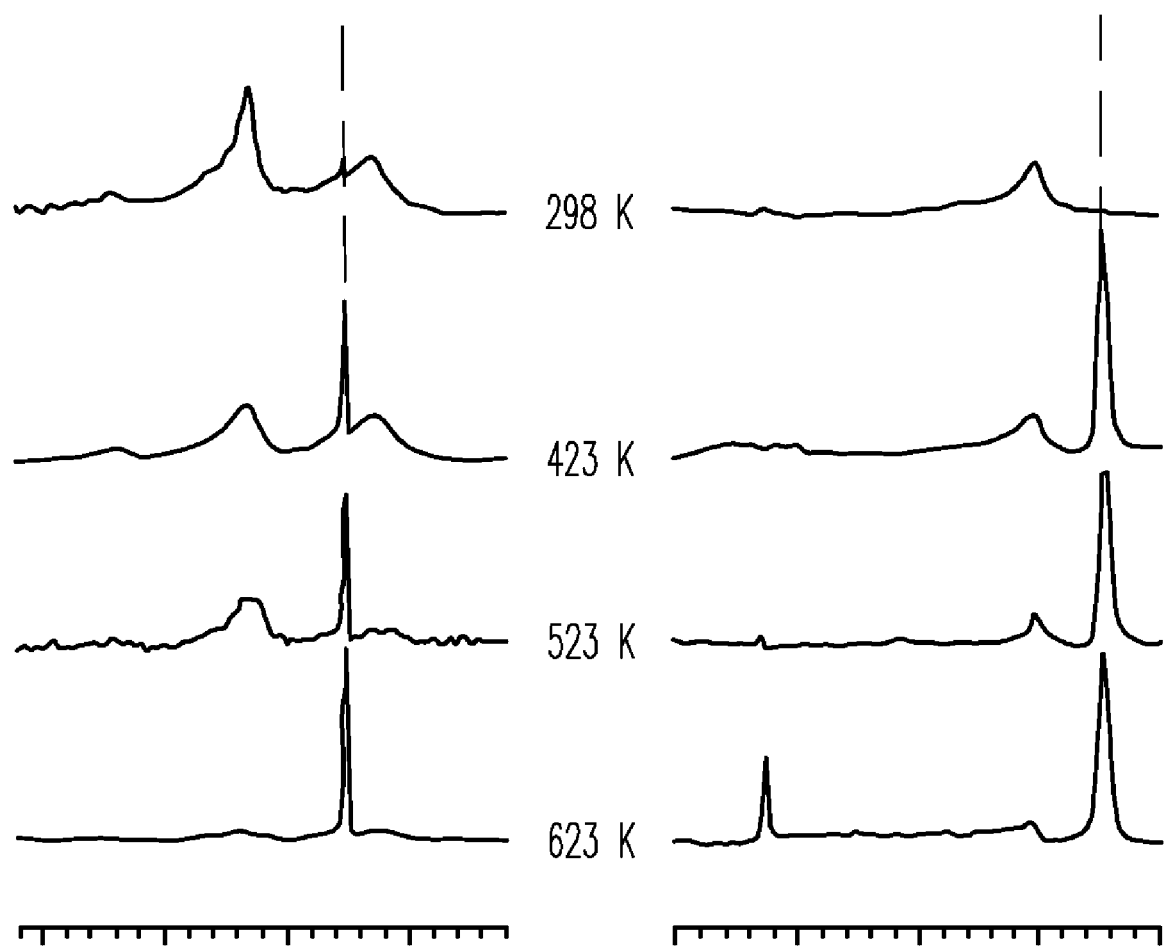
FIG. 19 illustrates MAS NMR spectra depicting $^{13}C$ single pulse and $^{15}N$ single pulse of labeled urea, NO and $O_2$ adsorbed in nanocrystalline NaY at various temperatures.

Complementary Solid State NMR ($^{13}C$ and $^{15}N$) Spectra of Labeled Urea, NO and $O_2$ on Nanocrystalline NaY The $^{13}C$ MAS NMR spectra for urea ($^{13}C$ and $^{15}N$ labeled), NO, and $O_2$ on nanocrystalline NaY, shown in FIG. 19(*a*), has a $^{13}C$ peak at 165 ppm prior to heating. This peak is assigned to the carbonyl group of adsorbed urea. After heating to T=423 K, there is a narrow intense peak present at 125 ppm that can be assigned to $CO_2$. After heating to T=623 K, there is a substantial increase in peak intensity for $CO_2$ at 125 ppm while the peak at 165 ppm is no longer present. FIG. 19(*b*) shows the $^{15}N$ MAS NMR of urea ($^{13}C$ and $^{15}N$ labeled), NO, and $O_2$ on nanocrystalline NaY. Before heating, the $^{15}N$ peak at -301 ppm is present and is assigned to the adsorbed urea. After heating to T=423 K, ammonia is produced as indicated by the peak at -356 ppm. After heating to T=523 K, a peak at -74 ppm is present and is assigned to $N_2$. After heating to T=623 K, there is substantial increase in $N_2$ peak and loss of intensity for the ammonia peak.

The solid state NMR spectra were acquired under conditions of thermal equilibrium due to the long periods of time required for signal averaging. In the presence of oxygen, the adsorption of NO in zeolite Y occurs in a similar manner as the adsorption of $NO_2$ due to the oxidation of NO into $NO_2$. Thus these NMR results can be readily compared to the FT-IR data in this study. The NMR results are also found to be consistent with the FT-IR results in that urea thermally decomposes to form $NH_3$ and $CO_2$ at elevated temperatures in the presence of NO and $O_2$. The most important aspect of the NMR results is the observation of the formation of $N_2$ which cannot be directly observed by FT-IR spectroscopy. As discussed previously, more than 80% of $NO_2$ was converted into $N_2$ in urea-SCR over nanocrystalline NaY zeolite based on mass balance for nitrogen (FIG. 8).

Reactions Between Gas-Phase $NO_2$ and Adsorbed Urea in NaY Zeolite at T=298 K

In this study, $NO_2$ adsorption in NaY zeolite occurs preferentially according to reaction 3 or 4 since there was a considerable amount of water remaining in the zeolite after evacuating the zeolite samples at room temperature.

$$2NO_2+H_2O \rightarrow HNO_3+HONO \tag{3}$$

$$3NO_2+H_2O \rightarrow 2HNO_3+NO \tag{4}$$

The nitric acid and nitrous acid further deprotonate and adsorb on surface cationic sites to form surface nitrate and nitrite. This explains the formation of surface nitrate, nitrite (FIG. 12) and gas-phase NO upon $NO_2$ adsorption in NaY zeolite (FIG. 13). The formation of nitrate on EFAL sites in nanocrystalline NaY zeolite was also observed (FIG. 12). In nanocrystalline NaY zeolite, $NO_2$ adsorption in part occurs on cationic sites of EFAL species ($M^{n+}$-$O^2$), according to reaction 5.

$$M^{n+}-O^-+NO_2 \rightarrow M^{n+}+NO_3^- \tag{5}$$

The formation of NO, HNCO and a small amount of $CO_2$ and $H_2O$ was observed when $NO_2$ was adsorbed in NaY zeolite with adsorbed urea at room temperature (FIGS. 13, 14 and 15). Isotopic labeling shows that the N-atom in HNCO originates from urea (FIG. 14). The loss of adsorbed urea was observed as well upon the adsorption of $NO_2$ (FIG. 13). Since the decomposition of urea into HNCO and $NH_3$ is not significant at room temperature, HNCO most likely formed in the reactions between urea and $HNO_3$ (reaction 6). The reaction between urea and HONO can lead to the formation of $CO_2$ and $H_2O$ at room temperature.

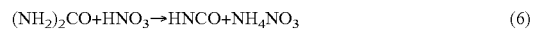
$$(NH_2)_2CO+HNO_3 \rightarrow HNCO+NH_4NO_3 \tag{6}$$

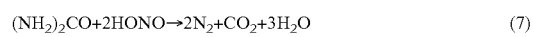
$$(NH_2)_2CO+2HONO \rightarrow 2N_2+CO_2+3H_2O \tag{7}$$

$NH_4NO_3$ can thermally decompose into $N_2O+2H_2O$, providing a minor route for N—N bond formation in urea-SCR of $NO_2$ in NaY zeolite. Reaction 7 is used in destroying excess nitrous acid in diazotization.

When commercial NaY zeolite was exposed to $NO_2$ at room temperature, surface species with a linear imido structure such as biuret appeared, most likely generated in the reactions between HNCO and adsorbed urea (FIG. 12). It is reported that amide carbonyls of bi- and tri-urets have characteristic absorption bands around 1750-1770 cm$^{-1}$. Biuret can be produced via reaction 8.

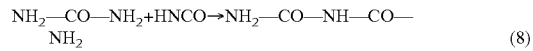
$$NH_2\text{—}CO\text{—}NH_2+HNCO \rightarrow NH_2\text{—}CO\text{—}NH\text{—}CO\text{—}NH_2 \tag{8}$$

The above analysis suggests that EFAL species in nanocrystalline NaY zeolite provide additional surface sites for $NO_2$ adsorption and its further reactions at room temperature. Previous studies show that EFAL sites on the external surface of nanocrystalline NaY zeolite are important for the formation of reactive nitrate and for the following SCR reactions. In this study, EFAL sites in nanocrystalline NaY zeolite also provide important surface adsorption sites for HNCO and inhibit the formation of undesired products such as biuret or triuret.

Thermal Decomposition of Urea in Nanocrystalline NaY Zeolite at T=473 K

The FT-IR spectra of the gas phase shown in FIG. 14 demonstrate that the thermal decomposition of urea occurred at T=473 K in nanocrystalline NaY zeolite. As described previously, gas-phase HNCO was produced initially and decayed rapidly after t=2 min (FIG. 14). The initial change in $H_2O$ concentration (FIG. 16(*c*)) is similar to that of HNCO. Not until t=2 min did the concentration of $NH_3$ in gas phase start to increase sharply (FIG. 16(*a*)). According to reaction 1, the first step in thermal decomposition of urea produces equal amounts of HNCO and $NH_3$. This suggests that most of the $NH_3$ produced in thermal decomposition of urea remained in the nanocrystalline NaY zeolite. In addition, the concentrations of $NH_3$ and $CO_2$ in gas phase increased sharply after t=2 min (FIGS. 16(*a*) and 16(*b*)). The kinetic data in FIG. 7 show that the initial formation rates of $NH_3$ and $CO_2$ in gas phase are 10.3 and 8.9 µmol L$^{-1}$ min$^{-1}$, respectively. This correlates well with the stoichiometry shown by reaction 2, in which 1 mole of HNCO hydrolyzes to form 1 mole of $NH_3$ and 1 mole of $CO_2$. Most likely, $NH_3$ formed in hydrolysis of HNCO in the zeolite immediately goes into the gas-phase at T=473 K.

Furthermore, both the loss of adsorbed urea and regeneration of surface silanol groups were observed in nanocrystalline NaY zeolite after urea-SCR of $NO_2$ (FIG. 18). The absorption frequencies for the urea bands (1527 and 1271 cm$^{-1}$) in the FT-IR spectrum of nanocrystalline NaY zeolite are different from those (1286 cm$^{-1}$) in the spectrum of commercial NaY zeolite which contains few silanol groups (FIG. 6). It can be concluded that in nanocrystalline NaY zeolite the adsorption and the thermal decomposition of urea involved the silanol groups on the external surface. Finally, HNCO produced in thermal decomposition of urea adsorbed and hydrolyzed on EFAL sites in nanocrystalline NaY zeolite. This is supported by the fact that HNCO adsorbed on EFAL sites was observed before (FIG. 12) and after urea-SCR of $NO_2$ (FIG. 18) in nanocrystalline NaY zeolite.

Figure 9:
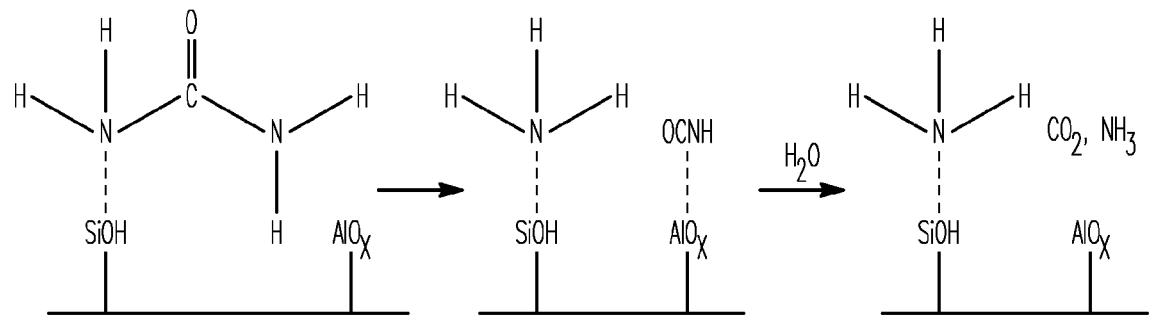
FIG. 9 illustrates a scheme depicting thermal decomposition of urea on silanol (SiOH) and EFAL ($AlO_x$) sites in nanocrystalline NaY zeolite.

Based on the above discussion, a mechanism can be proposed for the thermal decomposition of urea in nanocrystalline NaY zeolite (FIG. 9). Initially, urea adsorbed in nanocrystalline NaY zeolite by hydrogen bonding to silanol groups on the external surface. At elevated temperature (T=473 K), urea decomposed into HNCO and $NH_3$. While $NH_3$ remained on the silanol groups of nanocrystalline NaY zeolite via hydrogen bonding, HNCO adsorbed on EFAL sites and continued to hydrolyze and produce $NH_3$ and $CO_2$.

It is generally accepted that $NH_3$ is the actual reducing agent in urea-SCR of $NO_x$. In FIG. 9, urea adsorbed in nanocrystalline NaY zeolite by hydrogen bonding to silanol groups via one N-atom, leaving the other $NH_2$ almost unperturbed. This is consistent with the isotopic studies showing that the isotopic shift for the CNH vibration mode is the same as the isotopic shift for the $NH_3$ deformation mode of gas-phase $NH_3$ (FIG. 6). In addition, we suggest that $NH_3$ molecules produced in thermal decomposition of urea remained in nanocrystalline NaY zeolite by hydrogen boding with silanol groups on the external surface. When $NH_3$ was adsorbed in nanocrystalline NaY zeolite at room temperature, the loss of silanol groups was observed. $NH_3$ adsorbed on EFAL sites in nanocrystalline NaY zeolite was observed, too. In urea-SCR of $NO_2$ over nanocrystalline NaY, however, EFAL sites are more likely associated with the adsorption/reactions of nitrate and HNCO as discussed previously.

Desorption of urea occurred when the nanocrystalline NaY zeolite with adsorbed urea was heated at T=473 K, as shown by the presence of urea in the gas phase (FIG. 14). The spectra shown in FIG. 14 also indicate that most gas-phase urea stayed as stable species during the SCR reactions at T=473 K.

Formation of N—N Bond in Urea-SCR of $NO_2$ Over Nanocrystalline NaY Zeolite at T=473 K When nanocrystalline NaY zeolite was used in urea-SCR of $NO_2$, more than 80% of the total loaded $NO_2$ was converted into $N_2$, based on nitrogen mass balance. In this work, $N_2$ cannot be monitored directly by infrared spectroscopy, but was observed in complementary solid state NMR experiments. Isotopic studies show that only $^{15}NNO$ among four isomers of $N_2O$ was produced when $^{15}N$-urea was used in the SCR reactions (FIG. 14). Previous studies in literature suggest that N—N bond formation occurs in the reaction between $NO_x$ and $NH_3$ produced in thermal decomposition of urea. Based on isotopic labeling studies, it can be concluded that the formation of dinitrogen in urea-SCR of $NO_2$ over NaY zeolite involves both a N-atom from $NO_2$ and a N-atom from urea. As for the production of $N_2O$, the bond formation occurs when a N-atom from urea binds with NO from $NO_2$ through the N-atom.

In selective catalytic reduction of $NO_x$ using hydrocarbons, isotopic studies have shown that the N—N bond formation occurs between $NO_x$ from the gas phase and a surface N-containing adsorbate. In urea-SCR of $NO_2$ over nanocrystalline NaY zeolite, the N—N bond formation is complex since reaction might involve (i) surface adsorbed $NH_3$ and/or gas-phase $NH_3$, and (ii) gas-phase $NO_x$ and/or surface $NO_x^-$ ($NO_3^-$ and $NO_2^-$).

Previous studies on thermal reduction of $NO_2$ in nanocrystalline NaY zeolite demonstrated that NO was initially generated in thermal reactions of nitrate and nitrite at elevated temperatures according to reactions 9-11. $M^{n+}$ represents $Na^+$ or EFAL sites.

$$M^{n+}\text{-}NO_3^- \rightarrow M^{n+}\text{-}O^- + NO_2 \qquad (9)$$

$$M^{n+} + 2NO_2 \rightarrow M^{n+}\text{-}NO_3^- + NO \qquad (10)$$

$$M^{n+}\text{-}NO_2^- + NO_2 \rightarrow M^{n+}\text{-}NO_3^- + NO \qquad (11)$$

Although the concentration of NO decreased monotonically in urea-SCR of $NO_2$ over nanocrystalline NaY zeolite (FIG. 17(a)), further analysis suggests that the formation of NO via reactions 9-11 could have occurred. For example, the initial rate of $N_2O$ formation was much greater than the initial rate of NO loss in urea-SCR of $NO_2$ over nanocrystalline NaY zeolite (FIG. 7). The actual initial rate for N—N bond formation should be even greater since more than 80% of $NO_2$ was converted into $N_2$ in urea-SCR of $NO_2$ over nanocrystalline NaY zeolite. In urea-SCR of $NO_2$ over commercial NaY zeolite, the concentration of NO initially increased and then decreased after a maximum at t=9 min (FIG. 17(a)), indicating that both production and consumption of NO occurred at elevated temperature. Similar time course concentration of NO has been observed in propylene-SCR of $NO_2$ in nanocrystalline NaY zeolite.

Figure 10:
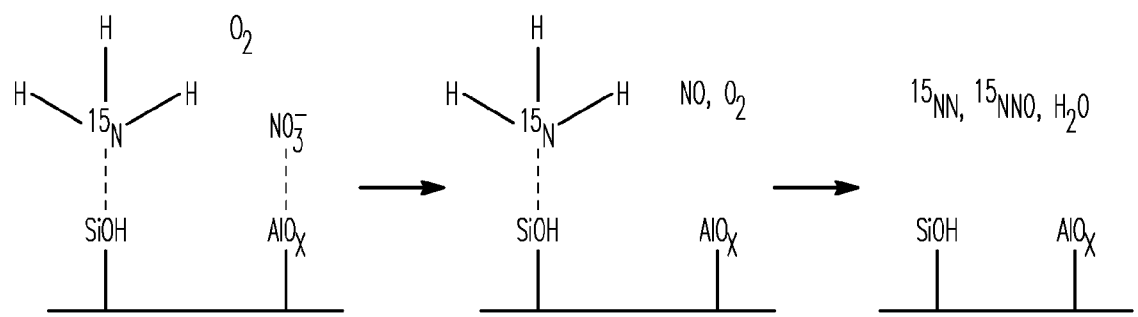
FIG. 10 illustrates a scheme depicting $^{15}N$-urea SCR on silanol (SiOH) and EFAL ($AlO_x$) sites in nanocrystalline NaY zeolite.

It has been suggested that OH groups and Bronsted acid sites on the catalyst surface can coordinate with and further activate $NH_3$. FIG. 10 describes a possible pathway for N—N bond formation in urea-SCR of $NO_2$ over nanocrystalline NaY zeolite. In the mechanism shown by FIG. 10, NO is released during the thermal reactions of nitrate and nitrite attached to $Na^+$ or EFAL sites and reacts with hydrogen bonded $NH_3$ to produce $N_2$ (or $N_2O$) and $H_2O$. Reaction 12 is the standard SCR reaction using $NH_3$.

$$4NH_3 + 4NO + O_2 \rightarrow 4N_2 + 6H_2O \qquad (12)$$

From the above discussion, a mechanism in which N—N bond formation in urea-SCR over nanocrystalline NaY zeolite occurs on the external surface and involves surface adsorbed $NH_3$ and NO from the gas phase is proposed. Minor pathways for N—N bond formation in nanocrystalline NaY zeolite include the thermal decomposition of $NH_4NO_3$ produced in the reaction between $HNO_3$ and urea (reaction 6). As it has been previously suggested that urea initially decomposes into CO and an $NH_2$ radical which consequently reacts with $NO_x$ to form $N_2$. However, this pathway is unlikely in urea-SCR over nanocrystalline NaY zeolite since CO was not observed in this study.

Origin of Size Effect in Urea-SCR of $NO_2$ Over NaY Zeolite

Reducing the zeolite crystal size can increase the external surface area and dramatically alter the diffusional properties of the zeolite materials. Infrared characterization revealed that silanol groups and EFAL species on the external surface are present in greater concentration in nanocrystalline NaY zeolite than in commercial NaY zeolite due to the difference in external surface areas. The external surface areas of nanocrystalline NaY and commercial NaY zeolite are 178 and ~4 $m^2/g$, respectively. Silanol groups and EFAL species on the external surface were found to be responsible for the improved performance of nanocrystalline NaY zeolite in propylene-SCR of $NO_2$. In the present study, urea-SCR of $NO_2$ using nanocrystalline NaY zeolite as the catalyst led to a significantly greater SCR reaction rate and less formation of undesired products than urea-SCR in commercial NaY.

The SCR reactions in nanocrystalline NaY zeolite occurred more quickly than in commercial NaY zeolite, as indicated by the initial rates for NO loss and $N_2O$ production listed in FIG. 7. Consequently, higher $NO_x$ conversion was achieved in nanocrystalline NaY than in commercial NaY zeolite after urea-SCR for 2 hours (FIG. 8). A significant amount of nitrate remained in commercial NaY zeolite after urea-SCR of $NO_2$ for 2 hours, but nitrate was barely observed in nanocrystalline NaY zeolite after 30 min (FIG. 18(a)). The enhanced SCR reaction rate in urea-SCR over nanocrystalline NaY zeolite can be explained by the existence of both silanol groups and EFAL sites. As described by FIG. 10, urea-SCR of $NO_2$ in nanocrystalline NaY zeolite involves both the production of NO from nitrate and the N—N bond formation between NO and $NH_3$ adsorbed on silanol groups. First, the silanol groups and EFAL species possess diffusional advantages since they are both located on the external surface of the nanocrystalline NaY zeolite. Furthermore, they are considered as chemically distinct surface sites. A major conclusion of this study and previous studies is that nitrate adsorbed on EFAL sites on the external surface of nanocrystalline NaY zeolite is more reactive than nitrate in the internal pores adsorbed to $Na^+$. The activation of $NH_3$ by silanol groups is also important for N—N bond formation.

As shown in FIG. 9, EFAL species on nanocrystalline NaY zeolite also provides important sites for the adsorption and fast hydrolysis of HNCO, which is essential for avoiding isocyanic acid emission and inhibiting the formation of undesired products. The kinetic data listed in FIG. 7 indicate that the hydrolysis of HNCO in nanocrystalline NaY zeolite occurred at a much faster rate compared to that in commercial NaY zeolite. This is consistent with the observation that gas-phase HNCO persists for a much longer period of time (>60 min, FIG. 15) in the presence of commercial NaY zeolite compared to nanocrystalline NaY zeolite (<20 min, FIG. 14). The time course measurements for $H_2O$ also indicate that hydrolysis happens much faster in nanocrystalline NaY zeolite than in commercial NaY zeolite (FIG. 16(c)).

To conclude, silanol groups and EFAL species are physically and chemically distinct surface sites, which are present on the external surface of nanocrystalline NaY zeolite. These sites are responsible for the improved performance of nanocrystalline NaY relative to commercial NaY since the majority of urea-SCR reactions occur on the external surface. The role of the internal surface is to store the $NO_x$ prior to SCR reactions on the external surface. Thus nanocrystalline alkali zeolites can be classified as new materials for SCR catalysts with potentially significantly better performance.

Urea-SCR vs. Propylene-SCR of $NO_2$ in Nanocrystalline NaY Zeolite

In a previous study, nanocrystalline NaY zeolite was examined in $deNO_x$ reactions at T=473 K using propylene as the reducing agent. It was found that nanocrystalline NaY zeolite was very sensitive to pre-adsorbed water in propylene-SCR of $NO_2$. Compared to urea-SCR, propylene-SCR appears to be a less realistic $deNO_x$ technology under typical conditions of humid, oxygen rich exhaust streams.

Although the effect of adsorbed water on urea-SCR is not studied in this work, water should not be detrimental to $deNO_x$ with urea over nanocrystalline NaY zeolite. First, water is necessary for the hydrolysis of HNCO in urea-SCR reactions (reaction 2). Second, it is suggested from the above discussion that at elevated temperature $H_2O$ did not inhibit the adsorption of $NH_3$ in nanocrystalline NaY zeolite. In urea-SCR of $NO_2$ over nanocrystalline NaY zeolite, the concentration of $H_2O$ in gas phase kept increasing after the urea-SCR reactions were finished around t=40 min (FIG. 16(c)). FIG. 16(a) indicates that the concentration of $NH_3$ in gas phase further decreased after t=40 min. Since the oxidation of $NH_3$ by $O_2$ was not significant under the experimental conditions described in this work, $NH_3$ most likely adsorbed on available silanol groups and/or EFAL sites in nanocrystalline NaY zeolite in the presence of water.

Compared to urea-SCR, a significant amount of nitrate and carbonaceous deposit remained in nanocrystalline NaY zeolite after propylene-SCR of $NO_2$ at T=473 K for 6 hours. The carbonaceous deposit in nanocrystalline NaY zeolite was found to hinder the adsorption of propylene and $NO_2$ and further SCR reactions. In urea-SCR of $NO_2$ over nanocrystalline NaY zeolite, surface nitrate was not observed after 2 hours of SCR reactions. Surface HNCO and $OCN^-$ were the only undesired products formed in urea-SCR over nanocrystalline NaY (FIG. 18). Furthermore, more than 80% of $NO_2$ was converted into $N_2$ in urea-SCR relative to ~20% selectivity to $N_2$ formation in propylene-SCR of $NO_2$ over nanocrystalline NaY zeolite. As mentioned previously, $NO_x$ emissions emerge at high velocity under typical lean burn conditions. At low temperatures, urea-SCR over nanocrystalline NaY zeolite appears to be an even more promising $deNO_x$ technology than propylene-SCR.

Location of EFAL Species

Figure 20:
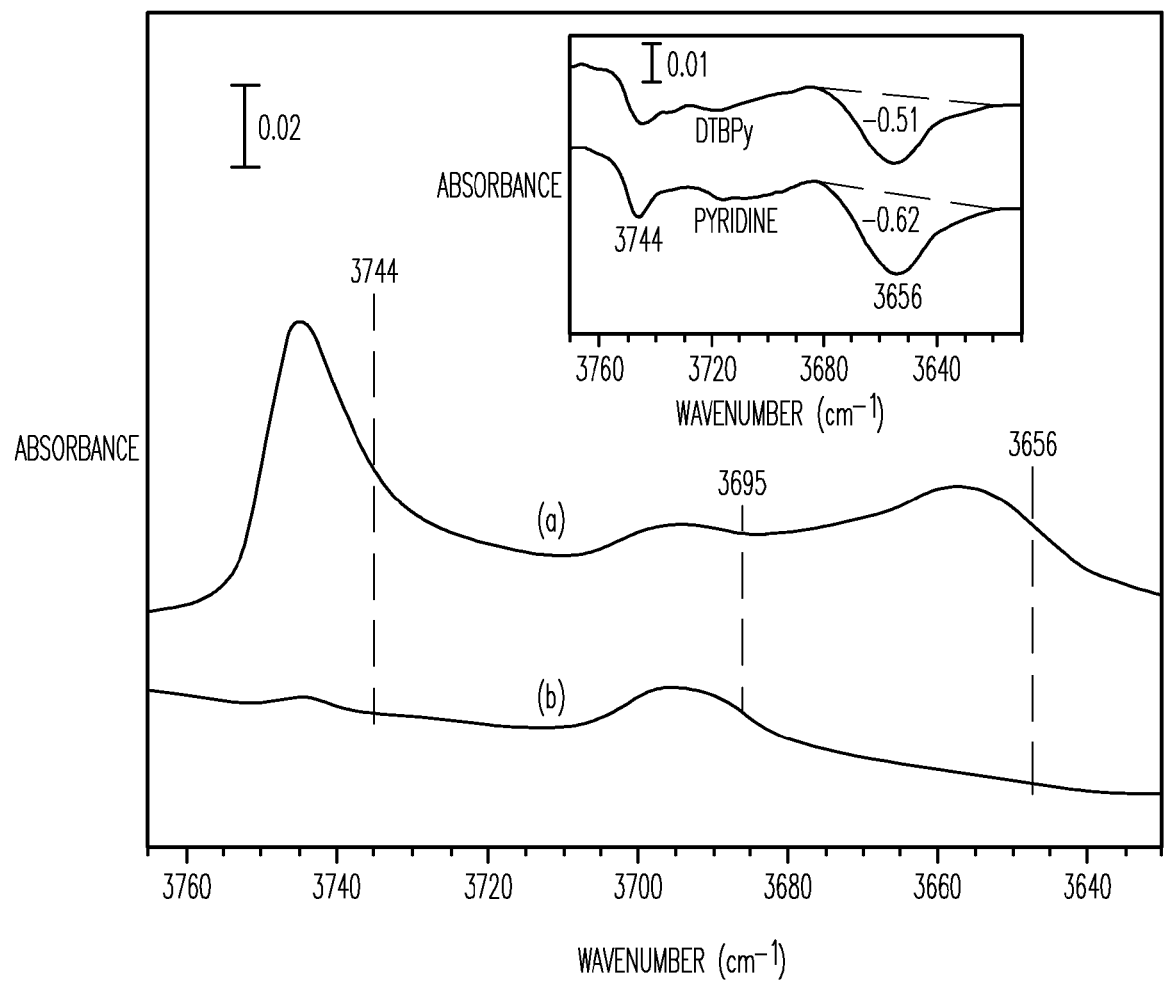
FIG. 20 illustrates FT-IR spectra of surface hydroxyl groups in nanocrystalline NaY and commercial NaY zeolite.

FIG. 20 shows the FT-IR spectra of nanocrystalline NaY zeolite and commercial sample after being heated overnight under vacuum at T=623 K. In the spectrum of nanocrystalline NaY zeolite, three absorptions are observed in the spectral region between 3765 and 3630 $cm^{-1}$. The most intense and highest frequency band at 3744 $cm^{-1}$ is assigned to terminal silanol groups that are on the external surface of the zeolite crystals. This feature is of much weaker intensity in the commercial NaY sample as expected since the external surface area is ~40 times smaller than the nanocrystalline NaY sample. The absorption band at 3695 $cm^{-1}$ is assigned to hydroxyl groups attached to $Na^+$. The band at 3656 $cm^{-1}$ is associated with hydroxyl groups attached to extra framework alumina (EFAL) species. Pyridine adsorption experiments coupled with FT-IR analysis have revealed the existence of Bronsted acid sites as well as Lewis acid sites associated with EFAL species only present in nanocrystalline NaY zeolite.

In order to determine the location of the EFAL species, adsorption of pyridine and 2,6-Di-tert-butylpyridine (DTBPy) in nanocrystalline NaY zeolite was conducted. It has been suggested that most EFAL species are located on the external surface of zeolite Y. While pyridine can adsorb into the zeolite pores, DTBPy can only interact with the hydroxyl groups on the external surface (and in the pore mouth region) of the zeolites since its kinetic diameter is larger than the pore opening of Y zeolites. Thus DTBPy was used as a probe molecule to characterize acid sites located on the external surface of the zeolites. The difference FT-IR spectra after pyridine and DTBPy adsorption on nanocrystalline NaY zeolite are shown in FIG. 20 (inset). The integrated absorbance of the negative peak at 3656 $cm^{-1}$ is approximately proportional to the amount of EFAL species with Bronsted acidity in nanocrystalline NaY zeolite. After DTBPy and pyridine adsorption on nanocrystalline NaY zeolite, the integrated absorbance of the negative peak at 3656 $cm^{-1}$ are −0.51 and −0.62, respectively. Therefore, it can be concluded that more than 80% of the EFAL species with Bronsted acidity are located on the external surface of nanocrystalline NaY zeolite.

Discussion

Nanocrystalline NaY zeolite exhibits enhanced $de-NO_x$ at low temperature (T=473 K) compared to commercial NaY zeolite, as shown by the present study on the selective catalytic reduction of $NO_2$ with urea. Silanol groups and EFAL species on the external surface of nanocrystalline NaY were found to be responsible for the higher SCR reaction rate and decreased formation of undesired products relative to commercial NaY zeolite. Isotopic labeling coupled with infrared analysis indicates that N—N bond formation involves both a N-atom from $NO_2$ and a N-atom from urea. In nanocrystalline NaY zeolite, kinetic studies indicated that $NH_3$ formed in thermal decomposition of urea was activated by hydrogen bonding with silanol groups and NO was initially produced in the thermal reaction of nitrate on EFAL sites. Consequently N—N bond formation occurred between $NH_3$ adsorbed on silanol groups and NO from the gas phase.

Nanocrystalline alkali zeolites can be visualized as new catalytic materials that have $NO_x$ storage capacity in the internal pores and high reactivity on the external surface. This provides multifunctional capabilities beyond that found for zeolites with a larger crystal size and smaller external surface area. Although for shape selective catalysis, the reactivity of the external surface can be undesirable, in reactions such as $deNO_x$ or hydrocarbon cracking, nanocrystalline zeolite catalysts can have greatly enhanced reactivity due to reactions on the external surface. This is the first example in the literature demonstrating that the increased external surface area (up to ~40% of the total surface area) of nanocrystalline zeolites can be utilized as a reactive surface with unique active sites for catalysis.

What is claimed is:

1. A method for the reduction of reactant gases comprising:
   (a) contacting a nanocrystalline zeolite with a reductant, sufficient to produce a nanocrystalline zeolite with adsorbed reductant thereon; and
   (b) exposing the nanocrystalline zeolite with adsorbed reductant thereon to reactant gases, for a sufficient time and at a sufficient temperature to obtain reduction of the reactant gases;
   wherein the nanocrystalline zeolite has a particle size of less than about 100 nm;
   wherein the reductant comprises ammonia;
   wherein the nanocrystalline zeolite comprises zeolite NaY.

2. The method of claim 1, wherein the reactant gases comprise nitric oxide (NO).

3. The method of claim 1, wherein the reactant gases comprise nitrogen dioxide ($NO_2$).

4. The method of claim 1, wherein the reaction products comprise water, nitrogen gas ($N_2$), nitrous oxide ($N_2O$), or any combination thereof.

5. The method of claim 1, wherein the reactant gases comprise oxides of nitrogen ($NO_x$).

6. A method for the reduction of reactant gases comprising:
   (a) contacting a nanocrystalline zeolite with a reductant, sufficient to produce a nanocrystalline zeolite with adsorbed reductant thereon; and
   (b) exposing the nanocrystalline zeolite with adsorbed reductant thereon to reactant gases, for a sufficient time and at a sufficient temperature to obtain reduction of the reactant gases;
   wherein the nanocrystalline zeolite has a particle size of less than about 100 nm;
   wherein the reductant comprises ammonia.

7. The method of claim 6, wherein the nanocrystalline zeolite comprises a transition metal, alkali, or alkaline earth nanocrystalline zeolite Y.

8. The method of claim 6, wherein the nanocrystalline zeolite comprises zeolite NaY.

9. The method of claim 6, wherein the reactant gases comprise nitric oxide (NO).

10. The method of claim 6, wherein the reactant gases comprise nitrogen dioxide ($NO_2$).

11. The method of claim 6, wherein the reaction products comprise water, nitrogen gas ($N_2$), nitrous oxide ($N_2O$), or any combination thereof.

12. The method of claim 6, wherein the reactant gases comprise oxides of nitrogen ($NO_x$).

13. A method for the reduction of reactant gases comprising:
    (a) contacting a nanocrystalline zeolite with a reductant, sufficient to produce a nanocrystalline zeolite with adsorbed reductant thereon; and
    (b) exposing the nanocrystalline zeolite with adsorbed reductant thereon to reactant gases, for a sufficient time and at a sufficient temperature to obtain reduction of the reactant gases;
    wherein the nanocrystalline zeolite has a particle size of less than about 100 nm;
    wherein the nanocrystalline zeolite comprises zeolite NaY.

14. The method of claim 13, wherein the reductant comprises urea.

15. The method of claim 13, wherein the reductant comprises ammonia.

16. The method of claim 13, wherein the reactant gases comprise nitric oxide (NO).

17. The method of claim 13, wherein the reactant gases comprise nitrogen dioxide ($NO_2$).

18. The method of claim 13, wherein the reaction products comprise water, nitrogen gas ($N_2$), nitrous oxide ($N_2O$), or any combination thereof.

19. The method of claim 13, wherein the reactant gases comprise oxides of nitrogen ($NO_x$).

* * * * *

UNITED STATES PATENT AND TRADEMARK OFFICE
CERTIFICATE OF CORRECTION

PATENT NO. : 7,858,062 B2 Page 1 of 1
APPLICATION NO. : 12/510776
DATED : December 28, 2010
INVENTOR(S) : Sarah Larsen et al.

It is certified that error appears in the above-identified patent and that said Letters Patent is hereby corrected as shown below:

In column 17, line 61, delete "($M^{n+}$-$O^2$)," and insert -- ($M^{n+}$-$O^{2-}$), --, therefor.

In column 17, line 63, delete " $M^{n+}$-$O^-$+$NO_2$→$M^n$+-$NO_3^-$ " and insert -- $M^{n+}$-$O^-$ + $NO_2$ → $M^{n+}$-$NO_3^-$ --, therefor.

Signed and Sealed this
Twenty-second Day of March, 2011

David J. Kappos
*Director of the United States Patent and Trademark Office*